:::: {.flex}

::::

US011010140B2

(12) United States Patent
Jaiswal

(10) Patent No.: US 11,010,140 B2
(45) Date of Patent: May 18, 2021

(54) INTEGRATION OF WORKFLOW AND LOGICAL DATA OBJECTS USING VISUAL PROGRAMMING

(71) Applicant: SAP SE, Walldorf (DE)

(72) Inventor: Poshak Jaiswal, Purnea (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/271,519

(22) Filed: Feb. 8, 2019

(65) Prior Publication Data

US 2020/0257507 A1 Aug. 13, 2020

(51) Int. Cl.
*G06F 8/34* (2018.01)
*G06F 8/10* (2018.01)
*G06F 3/0483* (2013.01)
*G06F 3/0482* (2013.01)
*G06F 16/28* (2019.01)

(52) U.S. Cl.
CPC .............. *G06F 8/34* (2013.01); *G06F 3/0482* (2013.01); *G06F 3/0483* (2013.01); *G06F 8/10* (2013.01); *G06F 16/284* (2019.01)

(58) Field of Classification Search
CPC . G06F 8/34; G06F 8/10; G06F 3/0482; G06F 3/0483; G06F 16/284
USPC ........................................................ 717/108
See application file for complete search history.

(56) References Cited

U.S. PATENT DOCUMENTS 7,234,105 B2   6/2007  Bezrukov et al.
9,542,165 B2   1/2017  Winkler et al.
10,699,231 B1*  6/2020  Ressler ............ G06Q 10/06316
2003/0154462 A1*  8/2003  Kumagai ............ G06F 9/44521
                                                    717/120
2010/0287530 A1* 11/2010  MacLean ............ G06F 11/3664
                                                    717/105
2016/0292245 A1* 10/2016  Wang ..................... H04M 15/58
2018/0247235 A1*  8/2018  Williger ............. G06F 16/24534
2019/0028517 A1*  1/2019  Zheng ................. H04L 65/1069
2020/0167361 A1*  5/2020  Princehouse ......... G06F 3/0644

OTHER PUBLICATIONS

Bodas, "HANA CDS Graphical Editor—Introduction," downloaded from https://blogs.sap.com/2017/01/12/hana-cds-graphical-editor-introduction/, 7 pp. (document marked Jan. 12, 2017).

(Continued)

*Primary Examiner* — Chat C Do
*Assistant Examiner* — Bradford F Wheaton
(74) *Attorney, Agent, or Firm* — Klarquist Sparkman, LLP

(57) ABSTRACT

Methods and apparatus are disclosed for integrating a workflow with logical data objects (LDOs), which expose their own external access methods and hide underlying data items. An interactive workflow specification can be authored by visual programming, and the workflow can be performed at a workstation via a graphical user interface. The visually-programmed specification can be automatically converted to markup language statements invoking ABAP calls to the LDOs' access methods. Underlying organization of LDO data can be transparent to reads and writes of the LDO data during workflow performance. Other aspects are described, including configuration of the authoring interface, launching the workflow, and text analytics.

19 Claims, 14 Drawing Sheets

(56) References Cited

OTHER PUBLICATIONS

Erwin, "All About the SAP HANA Database Explorer," downloaded from https://blogs.sap.com/2018/05/09/all-about-the-sap-hana-database-explorer/, 4 pp. (document marked May 9, 2018).
Onidh, "ITSmobile Visual Editor," downloaded from https://wiki.scn.sap.com/wiki/display/HOME/ITSmobile+Visual+Editor, 11 pp. (document marked May 23, 2018).

* cited by examiner

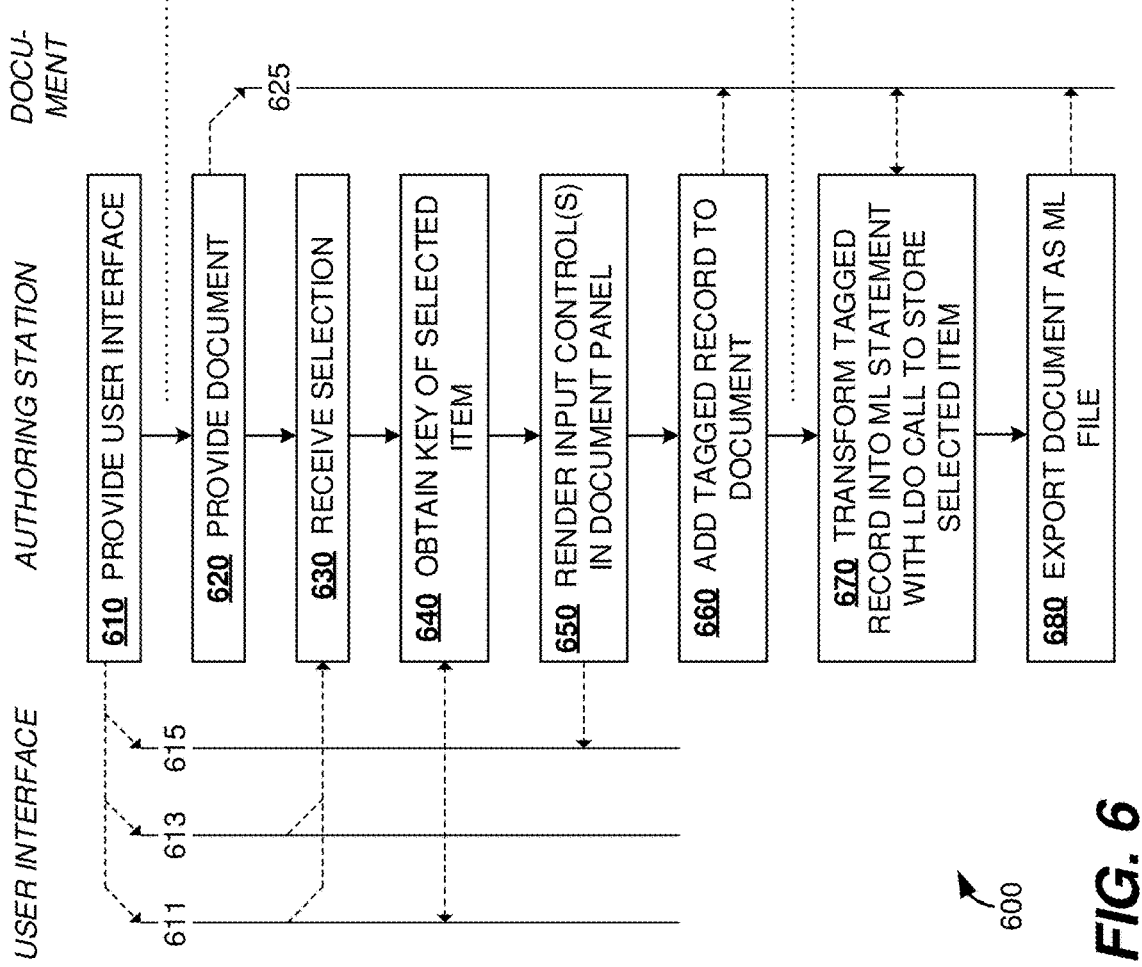

```
storeItemValue: function (oData, Value) {
// Parameters required by LDO from UI
    var oURLParameters = {
        _LDO: oData.LdoName,        // e.g. "MfgLog"
        _Key: oData.SerialNoKey,    // e.g. "K-789"
        _Item: oData.ItemName,      // e.g. "Length L [mm]"
        _Quantity: Value            // e.g. 11.7
    };
// Method defined in the gateway
    var sFunction = "StoreItemOfSerialNo";
// Post call as odata request to gateway
    this.getModel().callFunction("/" + sFunction, {
        method: "POST",
        urlParameters: oURLParameters,
        // set return status on Success or Error
        success: this.onSuccessAssemble.bind(this),
        error: this.onErrorAssemble.bind(this)
    });
}
```
1510

*FIG. 15A*

```
gDataProvider->MfgLogLDO_StoreItemOfSerialNo(
    EXPORTING
        _SerialNoKey = "K-789"
        _ItemName = "Length L [mm]"
        _Value = 11.7
    IMPORTING
        _Status = ReturnedStatus
).
```
1520

*FIG. 15B*

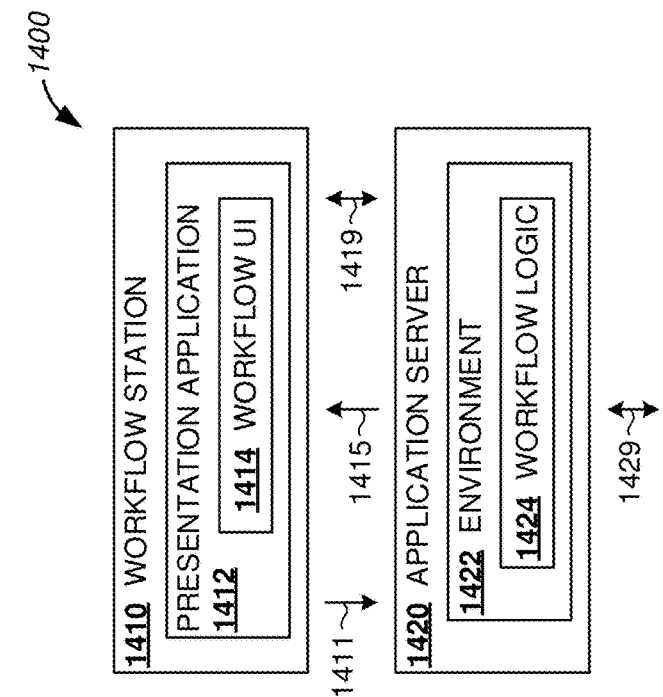

*FIG. 14*

```
<div LdoName = "Components",
     Key = "K-456",
     ItemName = "ScrewQuantity" > </div>
                                                        1610
```

FIG. 16A

```
GetItemValue: function (oData, Value) {
// Parameters required by LDO from UI
  var oURLParameters = {
    _LDO: oData.LdoName,        // e.g. "Components"
    _Key: oData.ComponentKey,   // e.g. "K-456"
    _Item: oData.ItemName,      // e.g. "ScrewQuantity"
    _Return: oData.Value        // returning e.g. 4
  };
// Method defined in the gateway
  var sFunction = "GetItemOfComponent" ;
// Post call as Odata request to gateway
  this.getModel().callFunction("/" + sFunction, {
    _method: "POST",
    _urlParameters: oURLParameters,
    // set return status on Success or Error
    _success: this.onSuccessAssemble.bind(this),
    _error: this.onErrorAssemble.bind(this)
  } );
}                                                        1620
```

FIG. 16B

```
gDataProvider->ComponentsLDO_GetItemOfComponent(
  EXPORTING
    _ComponentKey = "K-456"
    _ItemName = "ScrewQuantity"
  IMPORTING
    _Value = NumberOfScrews    // e.g. 4
).                                                       1630
```

FIG. 16C

INTEGRATION OF WORKFLOW AND LOGICAL DATA OBJECTS USING VISUAL PROGRAMMING

BACKGROUND

Software continues to evolve with increasing levels of integration. Conventionally, custom programming has been required to connect web-based and other applications to back-end databases and logic. Such a methodology can be cumbersome, error-prone, and subject to extensive software debugging.

Accordingly, there remains a need for technology to integrate advanced forms of software with associated workflows.

SUMMARY

Methods and apparatus are disclosed for integrating a workflow with an advanced software entity such as a logical data object (LDO), described further herein, which can expose its own methods for read or write access to its data, and can hide the underlying data structures. An interactive workflow specification can be developed by an author using a visual programming tool, and the workflow can be performed by a worker at a workstation via a graphical user interface. The disclosed technologies tie the workflow to data of the LDO, which can be a production database. The disclosed technologies can be implemented without either the author or the worker having knowledge of any text-based programming language or any database programming language, and having only high-level knowledge of the LDOs involved.

In certain examples, the disclosed technologies can be implemented as computer-readable media storing computer-executable causing one or more processors to perform certain operations to define an interactive workflow associated with logical data objects (LDOs) having data items stored in one or more production databases and accessible through interfaces of the LDOs. These operations include: presenting a specification of the interactive workflow, through a graphical user interface for visual programming; receiving user input that defines the specification of the interactive workflow, through the graphical user interface for visual programming; linking the output fields of the specification with the one or more production databases via respective retrieval calls to the interfaces of the LDOs; linking the input fields of the specification with the one or more production databases via respective storage calls to the interfaces of the LDOs; and storing the specification. The specification, as defined by the user input, includes input fields associated with at least some of the data items and output fields associated with at least some of the data items. Linking the output fields enables retrieval of current values of associated data items to be retrieved from the production databases using the LDOs' retrieval calls, during subsequent run-time presentation of the specification at a client device for performance of workflow operations of the interactive workflow. Linking the input fields enables storage of new values of data items associated with the input fields in the production databases. The new values are obtained through performance of workflow operations, and the storage operation uses the LDOs' storage calls.

In some examples, presenting the specification of the interactive workflow can include retrieving and displaying the current values of the data items associated with the output fields. The production databases can include a relational base, and at least one input field or at least one output field can be linked to a data element, a row, or a table, or a view of the relational database. The production databases can include a document management system, and at least one of the input fields or at least one of the output fields can be linked to a document stored in the document management system. The production databases can include a table shared between two or more LDOs. The client device can be a manufacturing workstation. The new values of input field data items can be measurements. The data items can include a first set of the data items which correspond to the input fields of the specification, and a second set of the data items which correspond to the output fields of the specification. Linking the output fields can include generating markup language statements invoking the retrieval calls to the interfaces of the LDOs. Linking the input fields can include generating markup language statements invoking the storage calls to the interfaces of the LDOs.

In certain examples, the disclosed technologies can be implemented as computer-readable media storing computer-executable causing one or more processors to perform certain operations. An authoring user interface is provided, including a document panel, a logical data object (LDO) panel, and a control panel. A document is rendered in the document panel. In response to a user selection of an indicator of a data item in the LDO panel, the selection associating the selected data item with an input field of the document, the following actions are performed. A key of the selected data item is obtained, an input control is rendered in the document panel, and a tagged record for the input field is added to the document. The tagged record is based on the key. Then, the tagged record is transformed into one or more markup language statements that, when processed, invoke a call to an LDO interface to store a data value associated with the selected data item. The document is exported as a markup language file including the one or more markup language statements. In some examples the call to the LDO interface can be in ABAP.

In some examples, the document can be a specification of an interactive workflow. In further examples, the operations can include providing a configuration screen, receiving a selection of an LDO data item on the configuration screen—the selection making the data item available for an output field of the document—and rendering an indicator of the selected LDO data item within the LDO panel.

In additional examples, the operations can include receiving a selection of a data item on the LDO panel—the selection associating the selected data item with an output field of the document—and in response performing the following actions. A key of the selected data item can be obtained, a tagged record can be added to the document for the output field, a current value of the selected data item can be retrieved using the key, and the retrieved value can be rendered in the document panel. The tagged record can incorporate the key of the selected output field data item. The selected data item can be an element of a row of a relational database table accessible through the LDO.

In further examples, the selected input field data item indicated in the LDO panel can be an inspection record, and the operations can include retrieving a display item of the inspection record, and rendering the display item in the document panel. The LDO panel can include a plurality of indicators of respective data items, along with respective indicia indicating whether the respective data items are referenced within the document.

In certain examples, the disclosed technologies can be implemented as an authoring station including one or more processors coupled to memory, the computer-readable media for performing operations as described above, and a network interface through which the authoring station can be coupled via a network to one or more LDOs represented in the LDO panel. In certain examples, the disclosed technologies can be implemented as a system including the above authoring station, a workstation, and an LDO computing environment. The workstation can be configured to receive at least part of the authored document and can support an interactive workflow specified by the document. The LDO computing environment can include a computer server, an operating system, a computer process serving calls to a given LDO, and a computer process running a database application associated with the given LDO.

In certain examples, the disclosed technologies can be implemented as a workstation having one or more processors with attached memory, a display, a network interface through which the processors are coupled to a network to access one or more LDOs, and computer-readable media storing instructions which, when executed, cause the processors to perform the following operations. An interactive document in a markup language is received, the document containing an input field call to an LDO and an output field call to an LDO. The interactive document is presented on the display. Presentation includes: executing the output field call to retrieve a current value of a data item associated with the output field; rendering the current value on the display; and rendering on the display an input field associated with the input field call. A user entry of a new value in the input field is received, whereupon the input field call is executed to transmit the new value for storage.

In some examples, the interactive document can be obtained from an authoring station coupled to the network. The authoring station can be configured to execute a visual editor program, and the visual editor program can be configured to: show representations of data items stored using the one or more LDOs, accept user inputs and user selections, and generate the interactive document.

The innovations can be implemented as part of one or more methods, as part of one or more computing systems adapted to perform an innovative method, or as part of non-transitory computer-readable media storing computer-executable instructions for causing a computing system to perform the innovative method(s). The various innovations can be used in combination or separately. The foregoing and other objects, features, and advantages of the invention will become more apparent from the following detailed description, which proceeds with reference to the accompanying figures.

BRIEF DESCRIPTION OF THE DRAWINGS

FIG. 6 is a flowchart illustrating a third example method according to the disclosed technologies.

FIG. 7 is a partial flowchart illustrating some optional features of the third method.

FIG. 8 is a partial flowchart illustrating further optional features of the third method.

FIG. 14 is a block diagram illustrating a second example deployment of the disclosed technologies.

FIGS. 15A-15B illustrate code for an example storage transaction according to the disclosed technologies.

FIG. 16A-16C illustrate code for an example retrieval operation according to the disclosed technologies.

DETAILED DESCRIPTION

Overview

Figure 1:
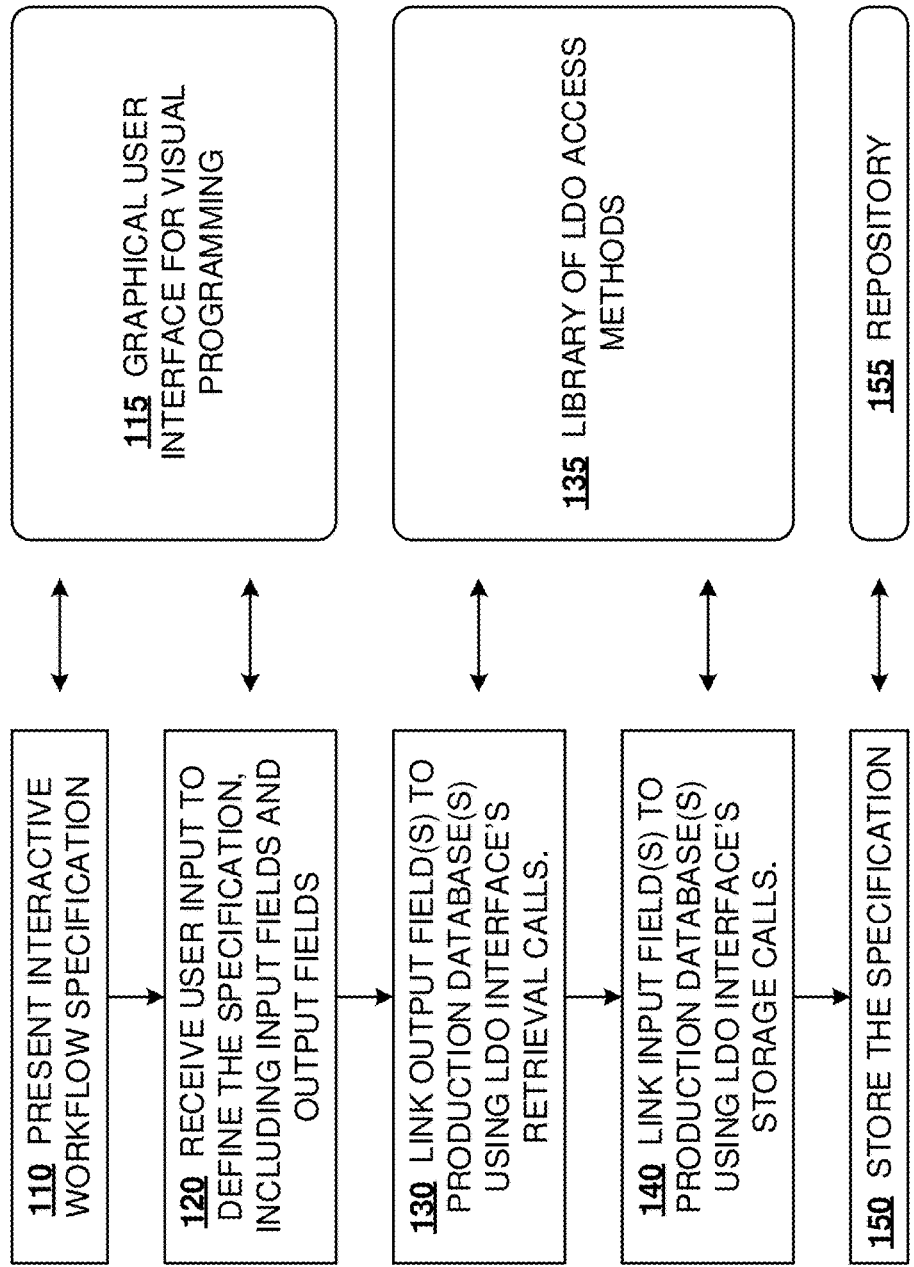
FIG. 1 is a flowchart illustrating a first example method according to the disclosed technologies.

Much as object-oriented programming has revolutionized text-based software development, enabling larger and more complex software applications, so also logical data objects (LDOs) enable development and maintenance of larger and more complex database applications. As described further herein, an LDO combines organized data with its own access methods, enabling data hiding.

Meanwhile, databases and LDOs do not exist in a vacuum. To have utility, they can be interfaced with real-world applications including manufacturing, security, or electronics design. Conventionally, custom scripts are used for such interfaces. SQL is popular for accessing databases, but is unsuitable for accessing LDO data, because an LDO provides its own access methods. A language such as ABAP is preferred for seamless invocation of an LDO's exposed methods.

However, ABAP is still a text-based language. As such, interfacing real-world applications to an LDO can require a combination of domain expertise and programming expertise. The disclosed technologies use visual programming to develop a workflow specification which provides the interface between a workflow and one or more LDOs. Accordingly, the workflow and the LDO can be integrated by an author having domain expertise but no knowledge of text-based programming languages or LDO internals. A worker performing the workflow can use the workflow specification to guide the workflow, accessing data from the LDO, and writing new data to the LDO, also without knowledge of text-based programming or LDO internals, and with less domain knowledge than the author of the specification. The disclosed technologies enable processes to be rapidly developed and LDO data to be reliably maintained.

Terminology

The usage and meaning of all quoted terms in this section applies throughout this disclosure unless clearly indicated otherwise or repugnant to the context. The terminology below extends to related word forms.

"Authoring" refers to a process for creating or revising a document.

The terms "control" and "control panel" are used distinctly. A "control" refers to any interactive element of a user interface (UI), i.e., an element that causes a function to be performed or a data value to be set when the element is selected or has a user entry made on it. Common examples of controls can include menus, buttons, or text entry fields. Controls can be freestanding or grouped, e.g., in a toolbar or menu. Controls can be static, dynamically appearing, or hidden.

A "control panel" is a panel of a user interface primarily comprising one or more controls and, optionally, one or more corresponding indicators. A common control panel described herein can provide text formatting functions or management of authoring operations involving input or output data fields of an interactive workflow specification. Controls can also be present in other panels of a user interface.

A "field" is a portion of a user interface in which information can be provided to or received from a user. An input field can be used to receive information from a user, and can be a text input box, or a control as described herein. Input fields can receive data to be added or updated in an LDO. An output field (sometimes, "display field") can be used to provide information to a user, which can be a text value of an LDO data item, an image, or an indicator as described herein. Fields can also be used to communicate static data, static images, or controls or indicators not directly associated with an LDO data item.

An "interactive workflow specification" is a document comprising text and/or graphics presentable in a generally human-readable format (or, for images, in a form generally recognizable by a human), and further including links to data items, e.g., data items belonging to one or more logical data objects (LDOs). The data items can be items input during performance of the workflow, for storage in an LDO, items obtained from an LDO and output to a user, or modifiable data items that can be both output and input. The specification can further include embedded logic (e.g., a script or a function call) which can be tied to UI items but is generally not directly visible on the UI. Therefore, authoring an interactive workflow specification can involve development of both the visual appearance of the rendered specification (i.e., the workflow UI, which can be previewed in a document panel of an authoring UI) and associated logic. Particularly, an action taken during authoring can result in updates to one or both of the UI and the specification, and updates to the specification can be distinct from updates to the UI.

A "logical data object" (LDO) is a collection of data together with associated methods. That is, the word "object" in LDO has a similar connotation as in object-oriented programming, where data is packaged with methods to support, among other features, data hiding. From another perspective, an LDO presents data items in terms of functions supported by the LDO. Access to LDO data items can be performed through the LDO's own access methods rather than through detailed knowledge of underlying relational databases or data structures. As such, a language such as SQL, which by design itself provides access methods for raw data, can be unsuitable to access data items through the LDO's access methods. Other languages, such as ABAP, may be used to interface with the LDO's access methods. Throughout this disclosure, references to an interface, access methods, retrieval calls, or storage calls of an LDO refer specifically to the interface, access methods, or calls defined as part of the LDO and exposed as the LDO interface for storage, retrieval, or other access to LDO data items, and not to external methods that bypass the LDO's defined methods, nor to internal methods used within the LDO. An LDO's access methods can be defined in terms of functions or in terms of messages. The data of an LDO can be organized within a relational database, another database or data structure, or as documents in a document management system, in any combination. LDOs also differ from classical objects of object-oriented programs in important ways. For example, an LDO exists as a stand-alone entity, and is not limited by the scope or lifetime of a particular software program. Further, two LDOs can share some of the same data. An LDO can be defined according to a schema, or can be dynamically extended, as described herein. For example, storing a new input data value in an LDO can involve extension of the LDO.

A "production database" is an organized collection of data that supports an activity and can evolve over the lifetime of the activity. For a manufacturing activity, a production database can include bill of materials (BOM), a material or parts database, routing instructions, measurement instructions, records of the manufactured parts, or infrastructure records of manufacturing equipment or personnel. The production database can include structured data, such as SAP Hana or another relational database, or can include unstructured data such as images and other documents maintained, e.g., in a document management system. A production database can be all or part of the data within an LDO. Thus, data items of a given LDO can be stored in a single production database or spread across multiple production databases. For example, an LDO for manufacturing can incorporate separate production databases for components, manufacturing records, or plant infrastructure. A production database can include data of multiple LDOs. Data for a set of LDOs in an interactive workflow specification can be stored in a single production database or be distributed between multiple production databases.

A "server" is a computer, implemented as hardware on which software is executed, providing a service or access to a resource for at least one client, and often for a plurality of clients. In this disclosure, servers can host LDOs, databases, visual programming tools, back-end or gateway logic, services, or can provide other functions.

A "station" refers to computing hardware at which a user interface is provided to a user to perform, or support performance of, an activity. Stations can have varying amounts or types of computing hardware, and can range from a terminal which has little more than a display, a display driver, and a communication port, to a stand-alone computer. Stations can also include clients and thin clients working in concert with a server. Some stations described herein are authoring stations, at which an author can develop a document such as a workflow specification, and workflow stations (sometimes, "workstations") at which a workflow is performed. Where stations are thin, the supporting computer can be a server, a virtual machine on a server, or a cloud-based implementation of either. Stations and servers are generally distinct; a station can often be a client device of a server computer. A station can include a network interface through which processors or other station components are coupled to a network. For example, an authoring station or workstation can be coupled to an LDO through a network interface and network.

A "user interface" (UI) generally refers to a graphical user interface rendered on a display, although a UI can extend to automated connections (e.g., over a bus, communication link, or network, including wireless coupling) to devices such as cameras, instrumentation, actuators, or machinery. A pointing device or a keyboard can be supported for selection of UI items or for making entries in UI text boxes. A UI can also include audio components such as speakers or microphone, or haptic feedback. A UI can be subdivided into distinct or disjoint areas dubbed "panels". In this disclosure, two notable UIs are an authoring UI used to develop a workflow specification at an authoring station, and a workflow UI presented to a user at a workstation when the workflow is performed.

"Visual programming" refers to a process for creating a computer program using a graphical user interface, without writing computer instructions as text. Visual programming is distinguished from conventional text-based programming where computer instructions are entered as text, then compiled or interpreted into computer-executable code. Visual programming does not preclude entry of descriptive text, labels, or selections as text. A visual editor is a software tool for visual programming.

A "workflow" is a sequence of operations for the performance of a task. Portions of this disclosure refer to documents that provide a specification of a workflow and are called workflow specifications. Such documents can be interactive.

First Example Method

FIG. 1 is a flowchart 100 illustrating a first example method according to the disclosed technologies. The method pertains to authoring an interactive workflow specification associated with logical data objects (LDOs).

At process block 110, the interactive workflow specification can be presented through a graphical user interface 115 for visual programming, at a display of an authoring station. The specification presented at process block 110 can be a blank specification, a template, a partially completed specification, or an earlier version of a specification being updated.

At process block 120, user input can be received at the graphical user interface 115. The user input can define the specification of the interactive workflow with input fields and output fields. Input fields can be associated with a first set of data items stored within one or more LDOs. Output fields can be associated with a second set of data items stored within one or more LDOs. The first and second sets of data items can be accessed through LDO interfaces, using interface methods exposed by the LDOs. The first and second sets of data items can be organized within production databases within the LDOs.

At process block 130, the output fields can be linked to the production databases using respective retrieval calls of the interfaces of the LDOs. At process block 140, the input fields can be linked to the production databases using respective storage calls of the interfaces of the LDOs. The retrieval calls and storage calls can be obtained from a library 135 of LDO access methods.

Subsequently, at "run time," the interactive workflow specification can be presented at a client device for performance of workflow operations. The output field linking at process block 130 can enable the corresponding retrieval calls to be used at run time to retrieve current values of the associated data items from the production databases. The input field linking at process block 140 can enable the corresponding storage calls to be used at run time to store new values of the associated data items to the production databases.

Then, at process block 150, the interactive workflow specification can be stored in a repository 155.

Numerous extensions and variations of the method are within the scope of the disclosed technologies. The specification can include descriptive text, formatting, icons, and other visual display items, in addition to the input fields and output fields. The specification can include modifiable fields that combine features of output fields (e.g. to show a present value) and input fields (e.g. to receive updated values). The retrieval calls can also be executed during authoring, to show current values (at the time of authoring) of data items associated with output fields on the graphical user interface. A production database can incorporate a relational database or a document management system. A data item linked to a field of the specification can be a table or view of the relational database, a record (row) of such a table or view, or an individual data element of such a record. Views can be defined using SAP HANA Core Data Services (CDS), for example. The data item can be associated with a key and can be accessed using the key. A data item can be a document or portion thereof, from a document management system. In a manufacturing environment, the new values of input fields can be measurements performed during a manufacturing workflow. The linking of input or output fields can include generation of markup language statements embedding or linked to the storage or retrieval calls. Other features and variations described elsewhere herein can also be combined with this method.

First Example Authoring User Interface (UI)

Figure 2:
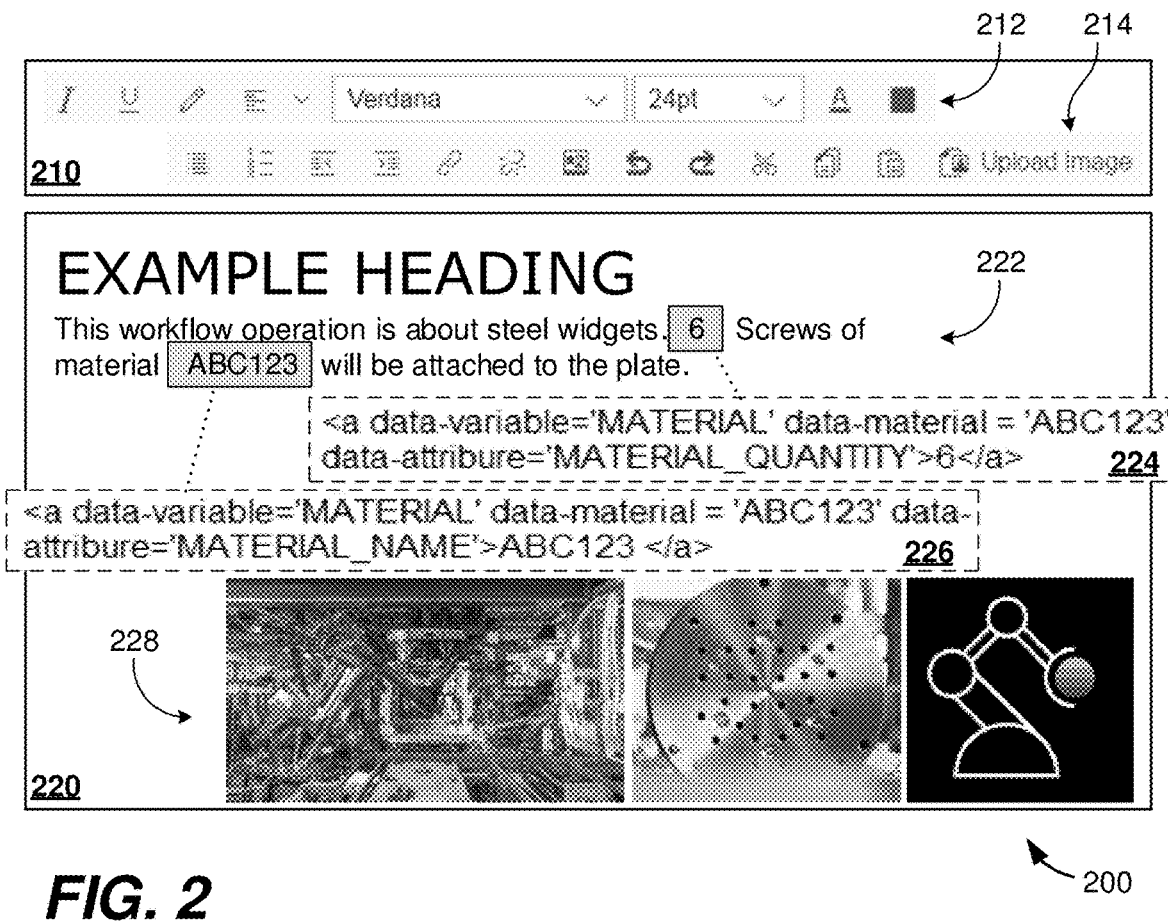
FIG. 2 is an illustration of a first example authoring user interface according to the disclosed technologies.

FIG. 2 is an illustration of a first example authoring UI 200 according to the disclosed technologies. This illustration focuses on control panel 210 and document panel 220, although, like other UIs described herein, the user interface 200 can include other panels also.

Control panel 210 can include one or more UI controls for text formatting or other operations. As illustrated, controls can be rendered as icons in a toolbar 212, or can be provided as a pop-up menu, drop-down menu, scrolling selection, ribbon, or other such metaphors as are known in the UI art. Text formatting controls can include, without limitation, controls for font selection, line or paragraph formatting, foreground or background colors, or pagination. Editing controls can include controls for undo, redo, cut, copy, paste, annotation, and similar features. Control panel 210 can also include controls to access a document management system. Illustratively, a control 214 for "upload image" is shown. Controls for "download image" or viewing documents can also be included. Other controls can be used to launch applications, such as a web browser or a database viewer.

As illustrated, document panel 220 shows a rendering of a portion of a document being authored, with some explanatory annotation. Document panel 220 can include a text block 222 and one or more images 228. Both text block 222 and images 228 can be rendered in the document panel 220 in the same manner as would be seen by a user when the authored document is subsequently deployed, e.g., on a workstation in association with performance of a workflow.

Within text block 222 are plain text, which can be arranged with the text formatting controls described herein, and also some values of LDO data items ("6", "ABC123") which can be formatted to distinguish from the plain text. Corresponding to the document panel 220, the associated document can include a tagged record for each of the data items whose value is shown in the document panel 220. In an example where the document is in HTML, a tagged record 224 can correspond to the value "6", with, e.g., "data-attribute='MATERIAL_QUANTITY'" being a tag, and "6" being a data value. Similarly, a tagged record 226 can correspond to the value "ABC123". Tagged records 224, 226 are included in FIG. 2 for purpose of illustration, but are generally not statically visible on the authoring UI. In some examples, items 224, 226 can be shown as an onscreen tooltip when a user's cursor hovers within an active region of rendered data items "6", "ABC123" respectively.

Images 228 can be incorporated into the document (e.g., using document management system controls in the control panel 210). Any suitable images can be used to document the workflow. For a manufacturing workflow, images can show a machine used for a manufacturing operation or a part being worked on. Images can be photographs or drawings. In examples, video or audio clips can be used. In some examples, the images can be presented as thumbnails, which can be expanded by user click or hovering of a pointing device.

The document portion within panel 220 can be contiguous with other portions, which can be accessed by continuous scrolling or discontinuous page operations (e.g., page-forward or page-backward). In further examples, the illustrated portion can be non-contiguous with other portions of the document, which can be accessed by a chapter or section menu, or by hyperlinks within the document.

Second Example Authoring User Interface

Figure 3:
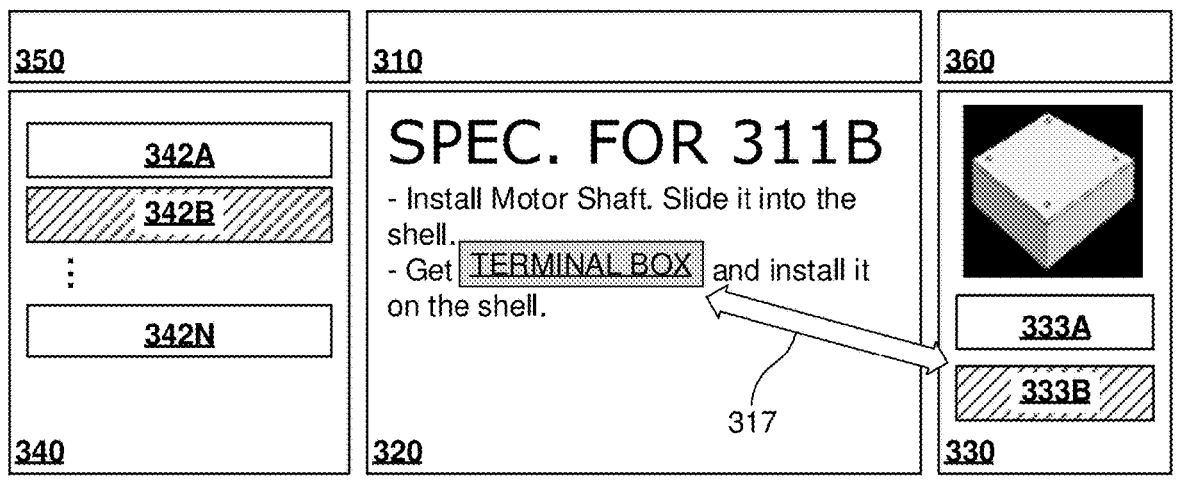
FIG. 3 is an illustration of a second example authoring user interface according to the disclosed technologies.

FIG. 3 is an illustration of a second example authoring UI 300 according to the disclosed technologies. Control panel 310 and document panel 320 are illustrated in simplified form but are generally similar to those illustrated in FIG. 2.

LDO panel 330 shows indicators of data items 333A-333B that can be available for incorporation into a document being authored. In the illustrated example, the data items can be parts on a bill of materials (BOM), however this is not a requirement. Any data item of any LDO can be made available on LDO panel 330 according to the needs of a given workflow. In some examples, data items can include specifications of measurements that can be required during the workflow. The indicators can include descriptive names or part numbers of the respective data items, and can also include other attributes, such as a present count of occurrences of each data item within the document. A currently selected data item 333B can be marked, e.g., by highlight or by an indicium, to indicate its selection.

By selection of a data item in LDO panel 330, the corresponding current value of that data item can be inserted at the current position within the document panel and, likewise, the corresponding tagged record can be included at the same position within the associated workflow document. That is, a binding can be created between the selected data item and a field at the current position in the document. In this illustration, the data item is a name of a part, namely "Terminal Box". Arrow 317 shows the connection between selected data item 333B and the current field ("Terminal Box") in document panel 320.

The LDO panel 330 can also show an image of the currently selected data item. In some examples, hovering a pointing device can cause the image to be shown in the LDO panel 330, or can cause the data value to be rendered in the document panel 320, while clicking on a data item 333B can lock the current value of the selection 333B in place within the document panel 320 or can write its tagged record within the associated document.

Navigation panel 340 can be used actively to navigate among sections 342A-342N of a document, or passively to track a current position among sections 342A-342N. The current position 342B can be shown highlighted or marked by an indicium. In other examples, panel 340 can be a bookmark panel.

The UI 300 includes additional panels 350, 360 that can serve various purposes. Panel 350 can indicate a project name, document name, or can identify the current author. Panel 360 can identify which LDO is presently active in LDO panel 330. These and similar panels can also be used for status or mode indicators, or as a message panel.

Second Example Method

Figure 4:
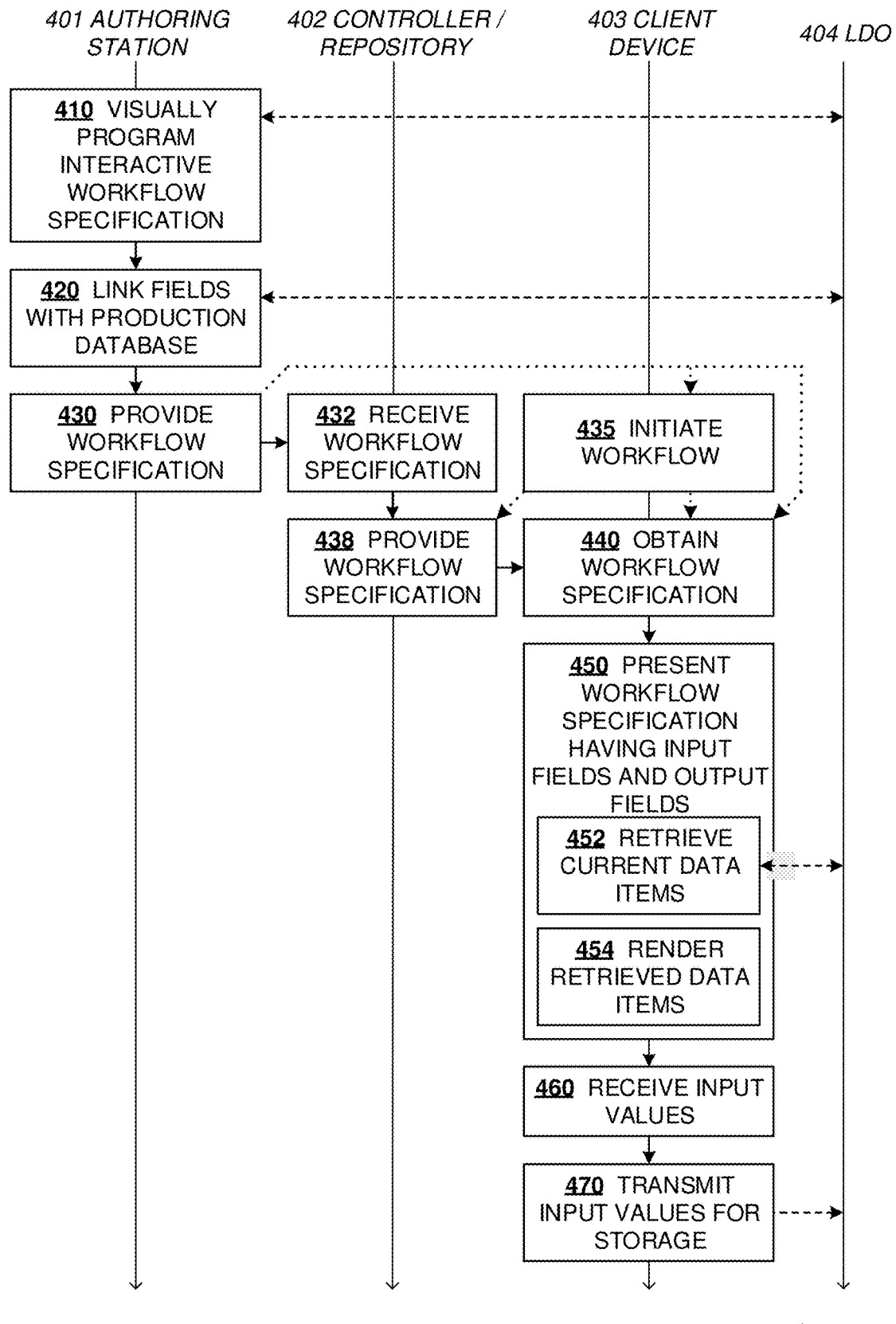
FIG. 4 is a flowchart illustrating a second example method according to the disclosed technologies.

FIG. 4 is a flowchart 400 illustrating a second example method according to the disclosed technologies. The method applies a visually programmed interactive workflow specification to maintain a production database during an interactive workflow. The production database can be encapsulated as a logical data object (LDO). Inasmuch as the method of FIG. 4 combines actions that can be performed at different computing stations, the flowchart 400 is illustrated with different lanes 401-404 for different computing entities. Lane 401 pertains to authoring of the interactive workflow specification, which can be performed at an authoring station as shown. Lanes 403, 404 pertain respectively to a client device at which all or part of the interactive workflow can be performed, and the LDO with which the workflow is integrated. Finally, lane 402 is shown for a controller or repository which can optionally bridge a gap between authoring of the specification and performance of the workflow. In this and other Figures, the lanes are illustrated with time generally increasing going down the page.

Beginning with the authoring activities in lane 401, the interactive workflow specification is visually programmed at process block 410. As indicated by a horizontal arrow, the visual programming can comprise interaction with the LDO, for example to access structures, data values, or documents of the production database. Particularly, the specification can incorporate output fields, designating values that are to be retrieved from the production database and output at the time the workflow is executed. Similarly, the interactive specification can incorporate input fields, representing values that are to be determined from the workflow and stored in the production database. These input and output fields correspond to respective entries in the production database, and can be accessed for reading or writing through an LDO interface.

At process block 420, the specification can be linked with the production database by introducing LDO interface calls for storage of the specification's input fields in the production database and for retrieval of the specification's output fields from the production database. In some examples, a field of the specification can be both an input and an output field: a current or prior value of the field can be retrieved from the production database by an LDO interface retrieval call, and an updated value of the field, as determined through the workflow, can be stored in the production database by a LDO interface storage call. The integration of storage and retrieval calls into the workflow specification can be based on a dictionary or other API exported by the LDO. Such linking can create bindings between fields of the specification and corresponding data items exposed through the LDO interface.

Although horizontal arrows in FIG. 4 indicate interaction between the authoring station and the LDO during performance of process blocks 410, 420, this is not a requirement. In other examples, LDO content can be pre-loaded at the authoring station during configuration of the visual programming environment, prior to process block 410, so that process block 410 can be performed without the overhead of communication with the LDO. Similarly, an LDO dictionary or API can also be pre-loaded at the authoring station, to make process block 420 more efficient.

With the specification fields linked to the production database at process block 420, the interactive workflow specification is ready for deployment, and can be output at process block 430, to be received at a client device at process block 440. Various alternatives for launching the workflow are illustrated in FIG. 4 and are discussed further below.

At process block 450, the interactive workflow specification is presented to a user of the client device. Current values of data items associated with the specification's output fields can be retrieved from the production database using the LDO interface retrieval calls at process block 452, and these retrieved items can be rendered to a display of the client device at process block 454. Through the workflow execution, values corresponding to input fields of the specification can be received at the client device at process block 460. In some examples, these values can be received by user input, e.g., by entry in a text box or selection of a radio button. In other examples, the values can be received using automation, such as from instrumentation connected to the client device by a bus or a communication link. Then, at process block 470, the received input values can be transmitted using LDO interface storage calls to be stored in the production database.

The description turns to the paths between output of the workflow specification at process block 430 and input of the workflow specification at process block 440. In a preferred embodiment, a controller is depicted in lane 402, the controller receiving the workflow specification at process block 432 from the authoring station, and subsequently providing the specification to the client device at process block 438 when it is desired to initiate the workflow. However, alternative techniques of workflow control can be used, and FIG. 4 illustrates a few possibilities.

In other embodiments, lane 402 can represent a repository rather than a controller. Whereas a controller can actively or autonomously initiate workflow, a repository can passively hold the workflow specification, received at process block 432, until an instruction to initiate the workflow is received from an external agent. For example, the client device can initiate a workflow as shown at process block 435. The dotted arrow joining process blocks 435, 438 represents the repository being triggered to provide the workflow specification to the client device responsive to a command or request from the client device. In further examples, process block 435, to initiate the workflow on the client device, can be performed at a controller or other agent device.

In additional examples, the authored specification can be directly conveyed from authoring station to the client device. The workflow specification is authored and directly used, as indicated by the dotted arrow directly joining process blocks 430, 440. In further examples, the workflow specification can be held at the client device until the workflow is initiated at process block 435, whence a workflow process obtains the workflow process from local storage at process block 440 and commences the workflow. Such a flow is indicated by dotted arrows joining process blocks 430, 435, and process block 435, 440. In all of these embodiments, the authoring station provides the workflow specification at process block 430, which is obtained, e.g., by a workflow process, at the client device at process block 440, either directly or indirectly.

In some examples, launching can be initiated by a client device user, who can request loading a workflow specification from a workstation UI. The workflow specification can be fetched from repository 402 by a gateway server associated with client device 403. The gateway can parse the workflow specification, retrieve LDO data as needed, and forward HTML, populated with LDO data to the client device 403, fulfilling the request from the client device user.

Numerous additional variations are also within the scope of the disclosed technologies, in addition to those described above. For example, any combination of the functions of an authoring station, a controller, a repository, or a client device can be combined at a single station.

An Example System

Figure 5:
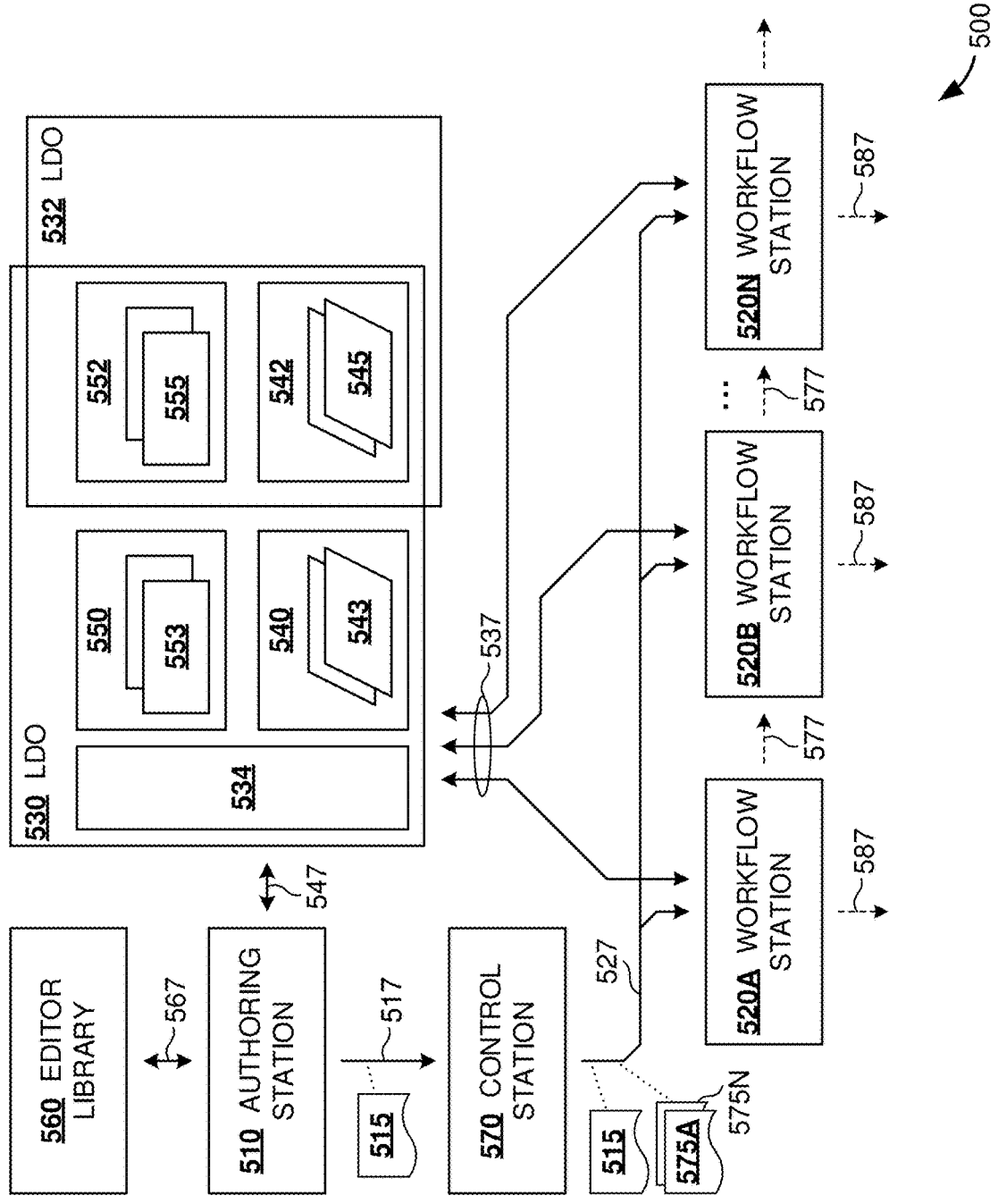
FIG. 5 is a block diagram of a system according to the disclosed technologies.

FIG. 5 is a block diagram of a system 500 according to the disclosed technologies. The principal components of this system include LDO 530, authoring station 510, and workflow station 520A.

LDO 530 can be implemented as a server, as an application, or as a service, on one or more hardware platforms providing computer processors and storage. LDO 530 includes a gateway service 534 and one or more data stores 540, 550. Data store 540 can be a relational database comprising a plurality of tables 543. Data store 550 can be a document management system storing one or more documents 553. In some examples, relational database 540 can store structured data, while document management system 550 can store unstructured data, however this is not a requirement. In other examples, unstructured data such as image files can be placed within relational database 540, or files having a structured relationship can be stored within document management system 550. Furthermore, the system can include additional LDOs such as LDO 532. Document management system 552 and relational database 542 can be shared among LDOs 530, 532, while document management system 550 and relational database 540 are exclusive to LDO 530.

Gateway service 534 provides an externally visible interface to the data stores of LDO 530, so that clients of the LDO can access data items stored in the LDO 532, for reads or writes, without knowing the internal structure of data stores 540, 542, 550, 552. Additionally, changes in such internal structure can be transparent to the clients. In some examples, the gateway service 534 can export one or more dictionaries to clients of the LDO. In additional examples, the gateway service can support pass through of native calls to relational databases 540, 542 or the document management system 550, 552 to provide efficient or proprietary access to these data stores.

Workflow station 520A can present an interactive workflow specification 515 to a user, as described herein, to guide the workflow associated with station 520A, and to manage the exchange of data items between station 520A and LDO

530 as indicated by bidirectional arrow 537. In some examples, traffic 537 between workflow stations 520 and LDO 530 can be mediated by a gateway server (not shown) providing back-end logic for the interactive workflow specification 515. The interactive workflow specification 515 can be created at authoring station 510, as described herein, and transmitted to a control station 570 as shown by arrow 517. The specification 515 can be stored at control station 570, and released to workflow station 520A at the time of initiating the workflow as shown by arrow 527.

In some examples, system 500 can have a single workflow station 520A, while in other examples the system 500 can include a plurality of workstations 520A, 520B, . . . 520N as shown. In the latter case, the workflow stations can operate as an assembly line, with partially completed work product transferred down the line from station 520A to 520B and so forth to station 520N as indicated by arrows 577. In this case, each workflow station 520A-520N can be provided with its respective portion 575A-575N of the specification 515, rather than the entire specification 515. Alternatively, workflow stations 520A-520N can operate in parallel, each performing the entire workflow and discharging work product in parallel as indicated by arrows 587. Other configurations are also possible, such as workflow stations organized in clusters. Each workstation 520A-520N can communicate independently with LDO 530 as shown by arrows 537. In some examples, workflow stations 520A-520N can access the specification 515 using a web browser. The browser can be pointed to a uniform resource locator (URL) hosted on the control station 570 or another server, and the specification can be retrieved as a webpage using that URL.

In some examples, authoring of the specification 515 can be performed using a visual editor loaded as an application on the authoring station 510, while in other examples, the visual editor instructions can be provided (arrow 567) from an editor library 560 or as a service. Authoring can involve communication 547 between authoring station 510 and LDO 530.

Third Example Method

FIG. 6 is a flowchart 600 illustrating a third example method according to the disclosed technologies. This method pertains to authoring an interactive workflow specification, and can be performed at an authoring station. For purpose of illustration, FIG. 6 depicts entities involved in various actions in lanes parallel to the main flowchart. A dashed arrow from a process block to a lane indicates that the process block acts on the associated entity, while a dashed arrow from a lane to a process block indicates that the entity provides input to the process block.

At process block 610, a user interface having an authoring screen can be provided. The authoring screen can have multiple panels, including a document panel (lane 615), a control panel (lane 613), and an LDO panel (lane 611). Generally, the user interface can support visual programming of a document linking a workflow to an LDO. As the document is edited or constructed, a preview of the document can be rendered in the document panel 615. Particularly, actions of the method involve both the document panel 615 and the underlying document. Generally, the LDO panel 611 can show a palette of data items accessible through the interfaces of one or more LDOs, which are available to be incorporated into the document. Particularly, the LDO panel 611 can contain an indicator, such as a name, for each available data item, rather than the data item itself. The control panel 613 can provide a palette of available editing actions. Example user interfaces are illustrated elsewhere herein.

At process block 620, an initial version of a document can be provided, and the document can be rendered in the document panel 615. In varying examples, this initial document can be a blank document, a template, a partially complete document, or a completed document to be revised. As described herein, the document can include portions suitable for rendering (such as input or output fields), and logic not suitable for rendering (such as tags or calls associated with those fields). Thus, the document and the rendition in the document panel can be parallel but not identical. At process block 630, a user selection of a data item indicator can be received from LDO panel 611. In some examples, this user selection can be accompanied by a user selection on control panel 613 to indicate that the selected data item is to be incorporated as an input field, while in other examples selection of the LDO panel indicator is sufficient to determine that the associated item is for an input field. In still other examples, the control panel selection can indicate that the selected data item is both an output field (showing a present value of the data item, and an input field (for receiving an updated value of the data item).

At process block 640, a key for the selected data item can be obtained, for example from a data structure underlying LDO panel 611 in the visual programming application. The key can uniquely identify one or more data items accessible through the LDO interface. At process block 650, an input control can be rendered in document panel 615 for the selected data item. The type of input control to render can, in varying examples, be determined from a control panel selection at process block 620 (e.g., "create input text box", "create input table", or "create radio buttons"), from the LDO panel selection at process block 620 (e.g., indicating that the selected data item is a string, a menu, or an image to be captured), or from the key obtained at process block 630 (which can indicate the type of selected data item, and thereby the appropriate form of input control).

At process block 660, a tagged record can be added to the document, indicating the presence of an input control and the key associated with the selected data item.

At process block 670, the tagged record is automatically transformed into a markup language (e.g., HTML) statement which can invoke a call (directly or indirectly) to the LDO interface to store a value of the selected data item. The HTML statement and call can be written into the document during the authoring phase, however execution of the call will generally be deferred until the document is put in service and an input value for the selected data item is received, during a workflow execution phase. In a preferred embodiment, process blocks 630-660 of FIG. 6 can be performed repetitively, following which process block 670 is performed once for multiple tagged records, however this is not a requirement. In other embodiments, LDO call translation and insertion can be performed separately for each input data item.

Then, at process block 680, the document containing markup language statements (which can invoke LDO interface calls) can be exported as a markup language document. The markup language document provides, e.g., a workflow specification in portable form which can be implemented with an established tool such as a web browser or presentation manager, while the LDO interface calls provide connectivity to the LDO and data entities contained therein. Visual programming enables the document to be authored without knowledge of any text-based programming language, and without knowledge of data representations within the LDO. Further, the exported document can be put in service (to perform an associated workflow) with minimal computer skills and without knowledge of data representations within the LDO.

Numerous variations are possible, such as alternative permutations of process blocks 630-670. Moreover, the method can be extended by incorporating other user interactions, such as for configuration of the LDO panel, for entry of static text or graphics, or for incorporation of output (display) data items into the document. FIGS. 7-8 illustrate some examples.

FIG. 7 is a partial flowchart 700 illustrating optional features of the third method, pertaining to configuration of the LDO panel. As in FIG. 6, lane 611 represents the LDO panel; and lane 717 represents a configuration screen of the user interface. Generally, the configuration screen 717 can be used to stock the palette of LDO panel 611 prior to authoring the document, so that desired data items are available during the authoring procedure. At process block 712, a selection of an LDO item can be received on the configuration screen 717. In varying examples, the selected item can be of any type or at any scale. The selected LDO item can be a specific data element of a database table, a record of a database table, a database table, a view, an unstructured data item such as an image file, or another data item stored in a document management system.

At process block 714, one or more indicators for the selected LDO item can be added to the LDO panel and rendered therein. Where the selected LDO item has structure, the indicator can be variously rendered as a single item, in expanded form showing various constituent parts of the LDO item, or in an expandable form with an indicium shown against a single item to indicate that the item can be expanded.

As indicated by dotted line, the method of flowchart 700 can be performed at an early stage of flowchart 600, however this is not a requirement. In other examples, the LDO panel can be dynamically edited at any point during an authoring procedure. The method of flowchart 700 can also be performed as a stand-alone procedure, independent of flowchart 600.

FIG. 8 is a partial flowchart 800 illustrating more optional features of the third method, pertaining to adding output fields to the document. As for FIG. 6, lanes are shown for the LDO panel 611, the control panel 613, the document panel 615, and the document 625. Lane 829 is shown for the LDO. The flowchart 800 roughly parallels process blocks 630-660 of flowchart 600.

At process block 822, a user selection of a data item indicator is received from the LDO panel 611. In some examples, this user selection can be accompanied by a user selection on the control panel 613 to indicate that the selected data item is to be incorporated as an output field, while in other examples the selection of the indicator on the LDO panel 611 is sufficient to determine that the associated item is for an output field. In still other examples, the control panel selection can indicate that the selected data item is both an output field (showing a present value of the data item), and an input field (for receiving an updated value of the data item).

At process block 824, a key for the selected data item can be obtained, for example from a data structure underlying the LDO panel 611 in the visual programming application. The key can uniquely identify one or more data items accessible through the LDO interface. At process block 826, a tagged record can be added to the document, indicating the presence of the selected data item in an output field. At process block 828, the current value of the selected data item can be retrieved using the key, and at process block 830, the current value of the selected data item can be rendered in the document panel 615. By way of example, the current value can be the value of a data element within a row of a relational database table stored in the LDO.

The method of flowchart 800 can be interspersed with other operations of an authoring procedure such as 600. For example, as indicated by dotted line, the method of flowchart 800 can be performed after the group of process blocks 630-660.

As with flowchart 600, the methods of flowcharts 700 and 800 are amenable to numerous variations within the scope of the disclosed technologies.

Fourth Example Method

The fourth example method can be performed at a workstation and can be described in context of the client device lane of FIG. 4. At process block 440, an interactive document is received. The interactive document can be formatted in a markup language, and can include output field calls to retrieve data items from an LDO and input field calls to store data items at the LDO, using the LDO's interface methods. In examples, the interactive document can be sourced from an authoring station coupled to an LDO and executing a visual editor program, as described herein. The visual editor program can show representations of items stored by the LDO, and can accept user inputs or user selections, to generate the interactive document.

At process block 450, the interactive document can be presented on a display of the workstation. Within process block 450, sub-block 452 can execute an output field call to retrieve a current value of an associated data item from the LDO, and sub-block 454 can render the current value on the display.

Turning to input, an input field associated with the input field call can be rendered on the display. At process block 460, a user entry of a new value is received in the displayed input field. Responsive to this user entry, the input field call can be executed at process block 470, to transmit the new value to the LDO for storage.

Fifth Example Method

Figure 9:
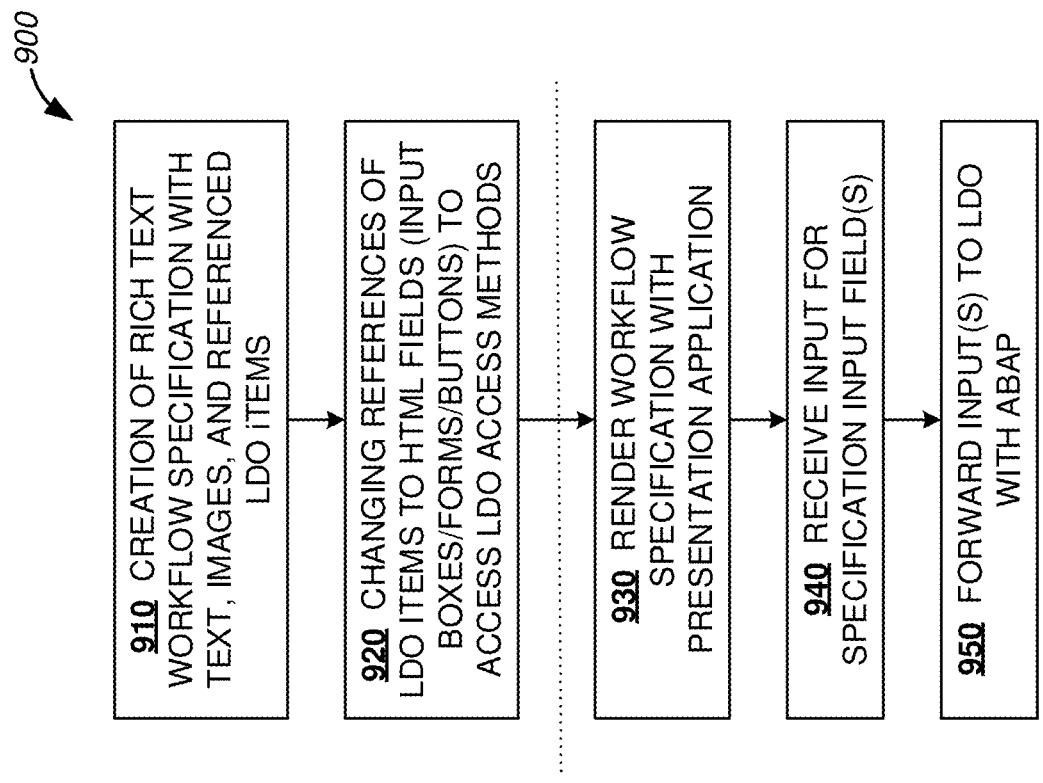
FIG. 9 is a flowchart illustrating a fifth example method according to the disclosed technologies.

FIG. 9 is a flowchart 900 illustrating a fifth method according to the disclosed technologies. Process blocks 910, 920 can be performed during an authoring phase, while process blocks 930-950 can be performed during a workflow execution phase, the separation being indicated by dotted line in flowchart 900.

At process block 910, a workflow specification can be created, incorporating text, images, and referenced LDO data items. The workflow specification can be created using a visual editor implemented as a local software application or a remote library or service, as described herein. At process block 920, references to LDO data items can be replaced with high-level language calls to input or output methods exposed by the LDO, which can be optionally wrapped in a standard markup language format. In some examples, the LDO's access methods can be directly invoked using a language such as ABAP. In other examples, a browser-side UI function (e.g. in JavaScript) can trigger a back-end application server to invoke the LDO's access methods. A language like SQL is not suitable for this, inasmuch as SQL is designed to itself provide an access method to raw data items, and does not have the facility to interface with exposed LDO methods.

At process block 930, to support workflow execution, the workflow specification is presented at a workstation. In examples, a presentation application such as SAP Fiori can be used as a presentation environment with which the workflow specification can be rendered. During the course of workflow execution, as input fields of the specification are encountered and acted upon, one or more inputs can be received at process block 940, as described herein. Input can be received manually from a user, or from associated automated devices. At process block 950, the user input can be forwarded for storage within an LDO, by an ABAP call to an LDO input method.

Sixth Example Method

Figure 10:
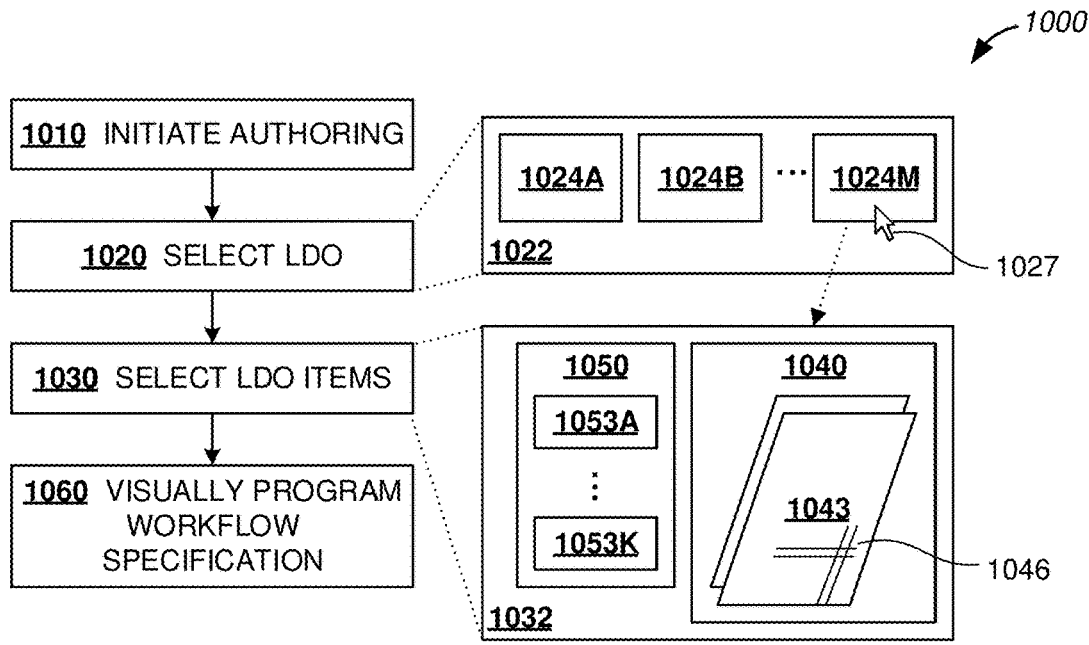
FIG. 10 is a hybrid diagram illustrating a sixth example method according to the disclosed technologies.

FIG. 10 is a hybrid diagram illustrating a sixth method according to the disclosed technologies. The sixth method pertains to configuring the authoring UI, in particular so the desired LDO data items are available (in an LDO panel of the UI) for incorporation into a workflow specification. On the left, flowchart 1000 illustrates the method, while the right side of FIG. 10 depicts associated user interface features.

At process block 1010, authoring of a desired workflow specification is initiated. Then, at process block 1020, the authoring interface is linked to one or more LDOs. UI 1022 can provide a selection of available LDOs 1024A-1024M as shown. An LDO can be selected by clicking with a pointing device, as represented by cursor 1027. LDO selection can include access validation by requiring an author to provide credentials. One or more LDOs 1024A-1024M can be selected, such as LDO 1024M. Then, at process block 1030, specific data items can be further selected within LDO 1024M. UI 1032 depicts a document management system 1050 and a database 1040 within the LDO 1024M. Thus, one or more documents 1053A-1053K can be selected from the document collection 1050. Database 1040 can include one or more tables 1043 organized by rows and columns, and a specific item 1046 can be selected within any of these tables. Alternatively, larger collections of data items can be selected, such as an entire record of a database table, an entire table 1043, the entire database 1040, or the entire document management system 1050. Pinpoint selection of specific data items provides an advantage of readily verifying that a workflow specification incorporates all selected data items registered on the LDO panel, i.e., there is no omission in the specification. Selection of larger data collections provides flexibility to adapt the workflow during the authoring phase and easily modify a workflow specification later in the workflow lifecycle, including as the LDO itself evolves. Selected data items of any scale can be added to an LDO panel as described herein.

With data items selected for the LDO panel, the workflow specification can be visually programmed at process block 1060.

Third Example Authoring User Interface

Figure 11:
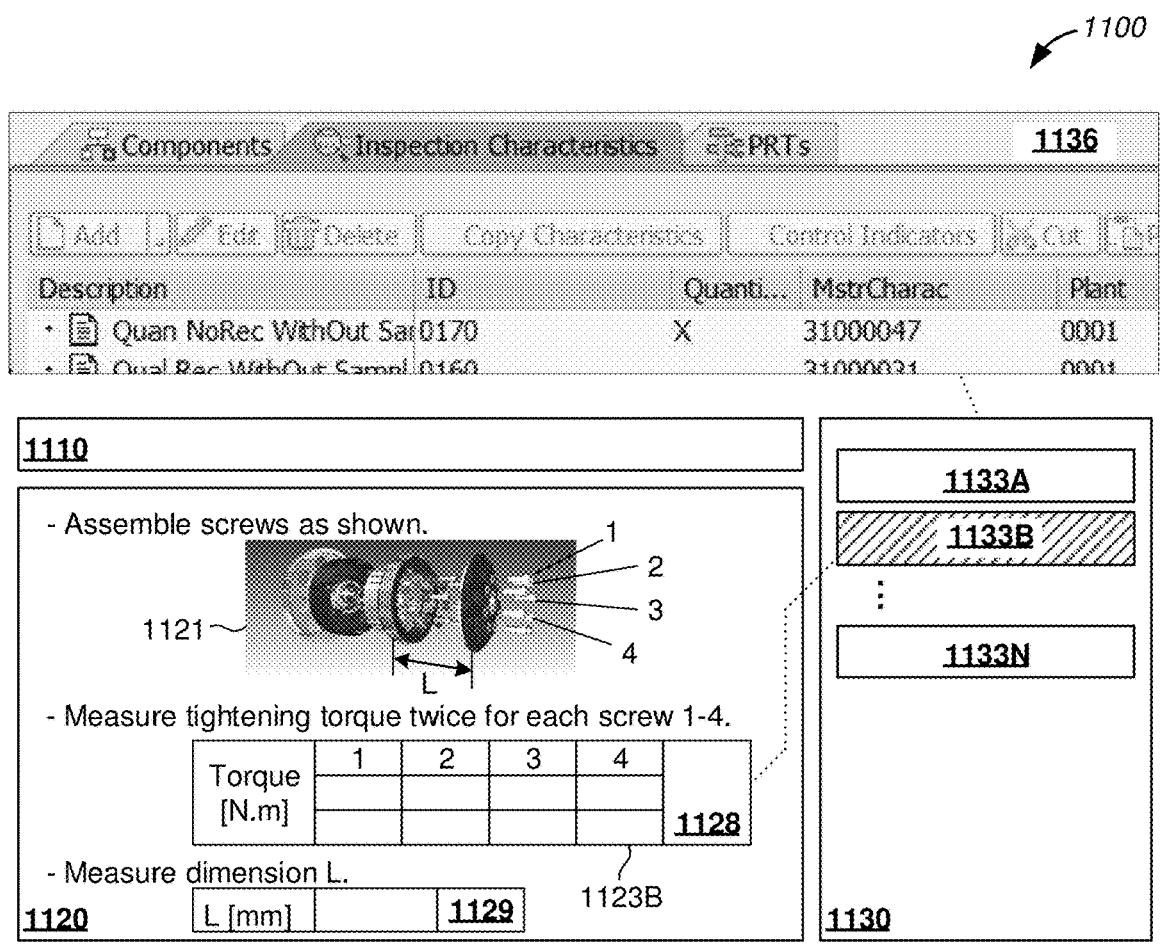
FIG. 11 is an illustration of a third example authoring user interface according to the disclosed technologies.

FIG. 11 is a third example authoring UI 1100 according to the disclosed technologies. UI 1100 is shown having three panels: a control panel 1110 generally similar to control panel 210 described herein, an LDO panel 1130 generally similar to LDO panel 330 described herein, and a document panel generally similar to document panels 220, 320 described herein. Supplementing FIGS. 2-3, FIG. 11 illustrates the inclusion of input fields into a workflow document.

Document panel 1120 illustrates incorporation of measurement input fields into a manufacturing workflow. A workflow operation is shown ("Assemble screws") together with an annotated image 1121 of a subassembly. To incorporate a measurement, the LDO panel 1130 can offer a selection of measurement specifications 1133A-1133N which define associated measurements as configured in an LDO Image 1136 is a snippet of an example LDO panel similar to panel 1130, illustrating various fields shown for each measurement specification (termed "Measurement Inspection Characteristics" in image 1136). As illustrated, tabs in the LDO panel can be used to organize LDO items. In this example, measurement specifications are grouped separately from components.

Upon selection of measurement specification 1133B, application logic within the authoring tool can unpack the measurement specification 1133B and generate a table of input boxes 1123B rendered within the document panel 1120, as shown linked to measurement 1133B by dotted line. In addition to the table, additional controls or indicators 1128 can be provided for measurement 1133B. Indicators can be used to indicate, during subsequent execution of the workflow, indicia such as successful completion of a measurement, measurements properly formatted (or not), measurements within (or outside) a tolerance range, omission of the measurement, or other parameters. The logic underlying such indicators can be incorporated or referenced within the workflow document, although not rendered in the document panel. Similarly, controls can be used to allow a user to make auxiliary inputs for a measurement, such as a control to clear measurements already taken so that they can be repeated, to confirm that the measurement values appear accurate in a case where the measurement has been flagged as outside a tolerance range, or to provide other parameters. As for indicators, the logic associated with input controls 1128 can be incorporated into a document while only the indicator itself and an optional label can be rendered in the document panel 1120.

Table 1123B illustrates tabular input of a multi-valued measurement. Document panel 1120 also illustrates a single-value measurement of the value L (from annotated image 1121), together with associated indicators or controls 1129.

Seventh Example Method

Figure 12:
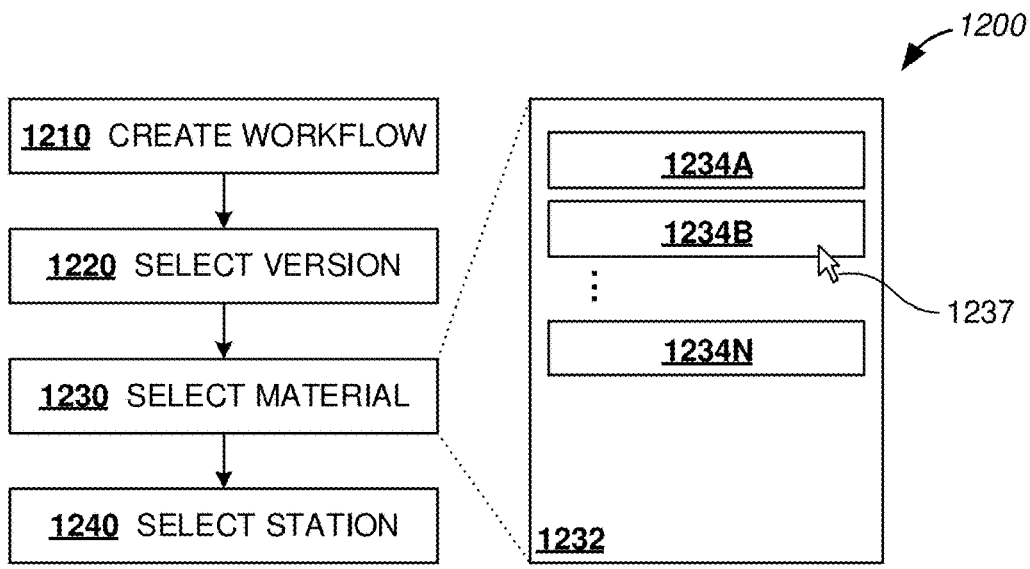
FIG. 12 is a hybrid diagram illustrating a seventh example method according to the disclosed technologies.

FIG. 12 is a hybrid diagram illustrating a seventh method according to the disclosed technologies. The seventh method pertains to launching execution of a workflow, using a previously authored workflow specification. Particularly, the workflow can be realized in different ways, and certain selections can be made so that the workflow is executed in a desired configuration. On the left, flowchart 1200 illustrates the method, while the right side of FIG. 12 depicts associated UI features.

At process block 1210, a workflow can be created. At process block 1220, a version of a workflow specification document can be selected. Different versions of a workflow specification can be maintained with a version control or other tracking system. While the newest version can often be chosen, earlier versions can also be selected. This can be advantageous where resources (machinery, materials, skilled personnel) required for a newer workflow version may be unavailable, or as a backup while quality issues with the newer workflow are resolved. At process block 1230, appropriate materials or other inputs for the workflow can be selected. As shown in UI 1232, a selection of materials 1234A-1234N can be offered and can be selected by clicking with a pointing device, represented by cursor 1237. In varying examples, the materials 1234A-1234N can be specific components (i.e., part numbers), bills of material (BOM), or other entities.

At process block 1240, a particular workstation can be selected for execution of the instant workflow. Although UI 1232 is only shown for process block 1230, similar UIs can be implemented for process blocks 1220, 1240. Alternatively, free form text input boxes can be used. Additionally, at each of process blocks 1220-1240, multiple selections can be made as suitable for the instant workflow.

With the instant workflow configured, the workflow specification and configuration information can be provided to a workstation, as previously described in context of process block 438, and the workflow can be performed.

First Example Deployment of a Workflow Specification

Figure 13:
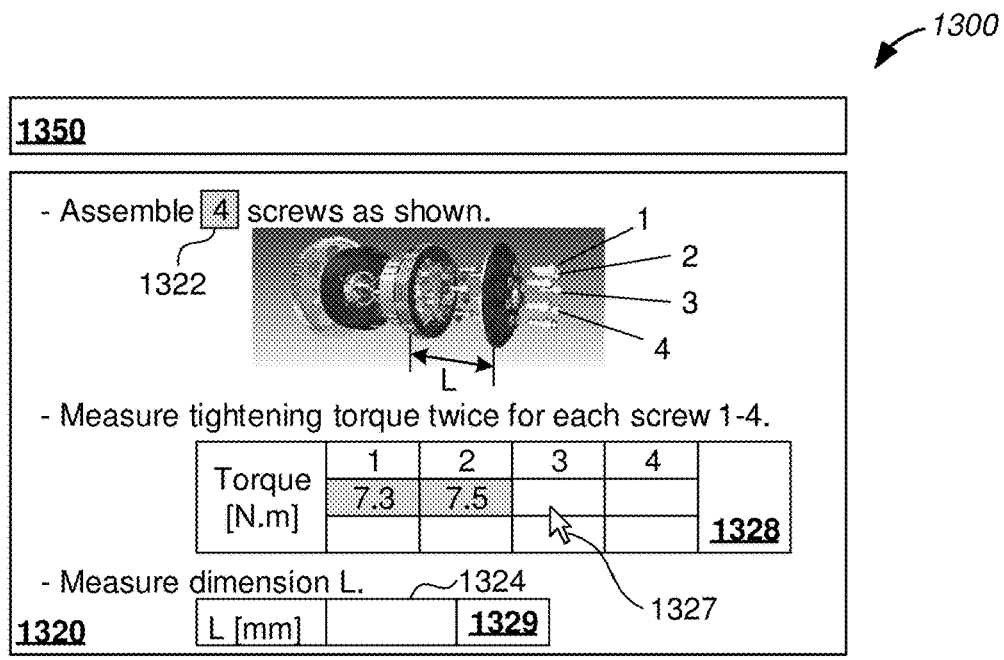
FIG. 13 is an illustration of a workflow user interface in a first example deployment of the disclosed technologies.

FIG. 13 is an illustration of an example UI 1300 as deployed while performing a workflow. UI 1300 has a workflow panel 1320 which mirrors the document pane 1120 as authored. UI 1300 also has an auxiliary panel 1350 which can provide general project, status, or messaging information similar to panels 350, 360 described herein. Unlike the authoring UI, the workflow UI 1300 has no LDO panel and no text formatting features of, e.g., control panel 210.

Workflow panel 1320 is shown with a measurement in progress. Measurements for screws 1 and 2 have been made in the shaded boxes, a next measurement can be selected as needed with a pointing device as represented by cursor 1327. Indicators 1328, 1329 can also be shown according to the current status of the associated measurements.

Second Example Deployment of a Workflow Specification

FIG. 14 is a block diagram 1400 illustrating a second example deployment of the disclosed technologies. Generally, the top block represents workflow execution at a workstation 1410, the middle block represents an application server 1420 providing logic for the workflow, and the bottom block represents one or more underlying LDOs 1430.

At the workflow station 1410, a presentation application 1412 such as SAP Fiori can present an interactive workflow UI 1414 to a user. In addition to user interactions via display, keyboard, microphone, or pointing device, the workflow UI 1414 can also be coupled to machinery or instrumentation. The workflow UI 1414 can be supported by application server 1420, which provides an environment 1422 within which workflow logic 1424 can be supported. Thus, the workflow specification can be split between workflow logic 1424 implemented on application server 1420 and workflow UI 1414 which can be managed from the application server 1420 and implemented on a workstation 1410.

Arrows 1411, 1415, 1419 indicate interactions between the workstation 1410 and the server 1420. Arrow 1411 represents registration of workflow station 1410 with the server 1420. Arrow 1415 represents provision of HTML or scripts from the server 1420 to the workstation 1410 for rendering or operating the workflow UI 1414. Arrow 1419 represents interactions associated with data items within the workflow specification. These interactions can include provision of current values of data items for output fields to the workflow UI 1414, provision of input data items to the workflow logic 1424, or communication of indicators or controls as described in context of UI fields 1128.

The server-side environment 1422 can include various data and logic in addition to the workflow logic 1424. Environment data can include cached data items belonging to LDOs 1430, or other configuration or operational data. Additional logic can include supervisory logic, middleware (e.g., interface logic, communication stacks) to interface with workstation 1410 or LDOs 1430, or text API functions such as those described below in context of FIG. 20.

Then, one or more LDOs 1430 can provide data repositories and associated methods supporting or supported by an instant workflow. Such data can include configuration data 1432, such as described in context of FIG. 10 or 12, data items 1434 for input and output fields of the workflow specification, or quality data 1436. The quality data 1436 can variously include (a) direct measurements such as described in context of measurement table 1123B, (b) indirect parameters of the measurements such as whether measurements are within a tolerance range, (c) some parameters associated with controls or indicators such as 1128, (d) metadata related to text analytics (including sentiment analysis) as described in context of FIG. 20, or (e) other quality data. Although FIG. 14 shows configuration data 1432 and quality data 1436 belonging to LDOs 1430, this is not a requirement. In certain examples one or more of these can be maintained locally within environment 1422, or stored in a separate database that is not part of LDOs 1430.

LDO 1430 can be hosted on or accessible through a server, variously termed as an LDO server or as a gateway server (e.g. corresponding to gateway service 534). This server can be regarded as a gateway to the data and methods of LDO 1430, and similarly application server 1420 can be regarded as a gateway to workflow UI 1414. In some examples, these two gateway servers can be collapsed into a single server.

Example Storage and Retrieval Transactions

FIGS. 15A-15B illustrate code 1510, 1520 for an example storage transaction according to the disclosed technologies. This example illustrates how data entered at a workstation can be stored in an LDO. In this example, a value of a Length L (as shown in FIG. 13) can be written to a manufacturing records LDO named MfgLog. In this example, a part having a unique serial number is being manufactured, and the MfgLog LDO stores a record for this part. Records in the MfgLog LDO can be keyed by the serial number. The storage transaction goes from a UI similar to 1414 at a workstation similar to 1410, to a back-end or gateway server similar to 1420, and from the gateway server to an LDO server. The storage operation is described with reference to FIGS. 13-14 and the specific code of FIGS. 15A-15B, however these are merely illustrative and other variations can be deployed.

Upon user entry of data into an input box such as 1324, an event handler can be triggered, causing a function StoreItemValue 1510 to be executed. As shown, a parameters object oURLParameters can be assigned values of an oData object associated with the particular input box 1324; these parameters include a key ("K-789") for the record of a part being manufactured (with a specific serial number), the LDO ("MfgLog") to which the record belongs, an identifier of the particular item to be written ("Length L [mm]"), and lastly the value itself. In this and other code samples, the formal parameters being assigned are shown with leading underscores (e.g. _Key) for clarity of illustration. Then, a function to be invoked at the gateway server 1420 is defined by string sFunction. Finally a POST is sent as an Odata request to the gateway server 1420 so that the function name StoreItemOfSerialNo and parameters structure oURLParameters are transmitted to the gateway server 1420. Execution of the StoreItemValue function 1510 occurs on workflow station 1410 and the transmission to the gateway server 1420 follows arrow 1419 downward.

The input box 1324, the event handler routine StoreItemValue 1510, and the bindings between the input box 1324 and the parameters oData.LdoName and oData.ItemName can all be established at the time of authoring the workflow specification. The serial number can be set when the workflow is launched on workstation 1410. Of these entities, the input box 1324 can be rendered in a document panel such as 1320, the serial number can be rendered in an auxiliary panel such as 1350, and the other entities are present in the workflow document. The function 1510 is shown in JavaScript, however other languages can also be used.

The gateway server 1420 can be configured to respond the Odata POST from UI 1414 and make a corresponding access to an LDO method. This functionality can be handled by a gDataProvider object which is part of workflow logic similar to 1424. Because the parameters received from the UI 1414 identify the LDO as "MfgLog" and the required function as StoreItemOfSerialNo, the gDataProvider object identifies and calls the StoreItemOfSerialNo function exported by the MfgLog LDO, which is registered within the gDataProvider as MfgLogLDO_StoreItemOfSerialNo 1520, and illustrated in FIG. 15B.

Function 1520 is shown written in ABAP, however other languages can be used. This functions passes its_SerialNoKey parameter, its_ItemName parameter, and the_Value to be stored to the server of the MfgLog LDO 1430. The values of these parameters are obtained from the oURLParameters received as transmitted by function 1510. The passed parameters are listed under EXPORTING, while the returned_Status parameter is listed under IMPORTING. The transmission from gateway server 1420 to LDO server follows arrow 1429 downward. The_Status parameter represents an acknowledgment or status indication from the LDO server back to the gateway server 1420, following arrow 1429 upward.

Finally, the gateway server 1420 can acknowledge write status back to the UI 1414, following arrow 1419 upward. In varying examples, the UI 1414 can be locked until a successful acknowledgment is received, or indicators can be displayed on workstation 1410 indicating that storing is in progress or has been successfully completed, or that the entered value was in error.

FIG. 16A-16C similarly illustrate code 1610, 1620, 1630 for an example retrieval transaction according to the disclosed technologies. This example illustrates how data can be retrieved from an LDO for display at a workstation. In this example, the number of screws to be tightened (4) is to be displayed 1322 in a document panel such as 1320. The retrieval transaction goes from a UI similar to 1414 at a workstation similar to 1410, to a back-end or gateway server similar to 1420, and from the gateway server to an LDO server. The value (4) obtained from the LDO is returned to UI 1414 along the reverse path. The storage operation is described with reference to FIGS. 13-14 and the specific code of FIGS. 16A-16C, however these are merely illustrative and other variations can be deployed.

During authoring, the output field 1322 can be associated with a tagged record 1610, the tags of which indicate that the output field is to be obtained from an LDO named Components, and a record having a key K-456, with the particular data item named ScrewQuantity, as shown. At runtime, an XML parser operates on tagged record 1610 and can determine that a value can be retrieved as specified by the illustrated tags. Accordingly, the UI function GetItemValue 1620 is called at workstation 1410. Similar to function 1510, appropriate parameters are packaged in a parameters object oURLParameters, a string sFunction defining the LDO function to be called is specified, and an Odata POST request is transmitted from UI 1414 to gateway server 1420. The transmission follows arrow 1419 downward. The XML parser can be part of the presentation manager 1412.

At the gateway server 1420, the specified function exported by the specified LDO is identified and called, which in this example is registered as ComponentsLDO_GetItemOfComponent 1630 in the gDataProvider workflow logic object. Similarly to function 1520, the key and item name are passed as parameters to the Components LDO (under EXPORTING), and the number of screws (4) is returned as_Value parameter (under IMPORTING). The transmission from gateway server 1420 to the Components LDO 1430 follows arrow 1429 downward, and the value is returned along arrow 1429 upward.

Finally, the returned value (4) is attached to the oData object and returned from gateway server 1420 to the UI 1414, along arrow 1419 upward, where it can be rendered in the document panel as shown in output field 1322.

In this example, tagged record 1610 is illustrated in HTML, workstation function 1620 is illustrated in JavaScript, and gateway function 1630 is illustrated in ABAP, however other languages can be used. Although FIGS. 16B-16C have been described as executed at runtime, i.e. during initialization or performance of a workflow, this retrieval transaction can also be performed during authoring, so that the document panel is appropriately populated with output field values obtained from respective LDOs.

Numerous variations of the storage and retrieval operations are possible. In some embodiments, the gateway server can be eliminated and UI logic can directly call exposed LDO access methods. In additional embodiments, varied relationships between keys and LDO data items can be established. In the examples above, keys correspond to records of a database table or view, and an ItemName is used to specify a particular item of the record. In other examples, the key can be specific to the data item (e.g. length measurement or number of screws) and the ItemName may not need to be provided separately. In the examples above, transmissions from functions 1510, 1620 include the LDO name. In other examples, a workflow specification can be associated with a single LDO, or the key can encode the associated LDO, in which case the LDO name need not be transmitted to the gateway. In further examples, additional parameters can be included, such as an identifier of a particular production database, table, or view within the LDO, in addition to a key of a record or data item. In the examples above, some parameters are represented as strings for clarity of illustration, but this is not a requirement. Any parameter can be typed as a string, Boolean variable, categorical variable, integer or floating point number, or a vector or other data structure, in any combination.

Example Features of Logical Data Objects

In any of the examples described herein, a logical data object (LDO) can contain a definition of a hierarchical data structure and definitions of one or more operations that can be performed using portions of the hierarchical data structure. LDOs can be used to define a particular application and/or problem domain space. Aspects and artifacts of a given problem domain can be defined using the hierarchical data structure and various portions of these aspects or artifacts can be associated directly with definitions of relevant logical operations.

Figure 17:
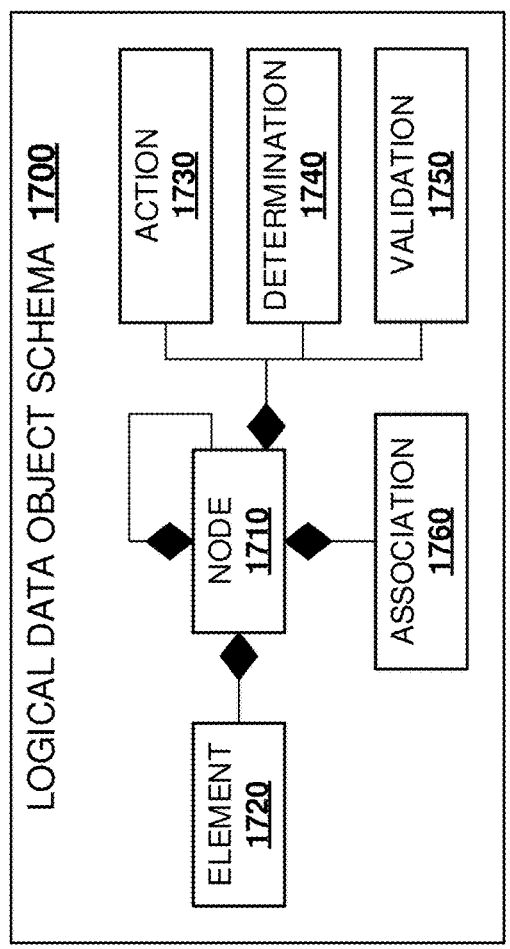
FIG. 17 is a diagram of an example schema of a logical data object (LDO) according to the disclosed technologies.

FIG. 17 is a diagram of an example LDO schema 1700. A node 1710 can contain one or more data elements 1720. A data element 1720 can contain an identifier, such as a name, and an associated value. In at least some embodiments, the data element 1720 can be associated with a data type that restricts or validates the type of data that can be stored as a value of the data element 1720. The node 1710 can contain one or more child nodes 1710 (also referred to as sub-nodes), which can themselves contain additional data elements 1720. Combinations of sub-nodes 1710 and data elements 1720 can be used to define a hierarchical data structure of multiple nodes 1710. In at least some embodiments, the hierarchical data structure can contain a root node that does not have a parent node and can be used as an entry point for traversing the hierarchical data structure. Further LDOs can contain two or more distinct hierarchical data structures, with or without associations between them.

Each node 1710 in the LDO can be associated with one or more actions 1730. An action 1730 can comprise a definition for a logical operation that can be performed using the node 1710, with which it is associated. The action 1730 can contain an identifier that can be used to invoke the action's logical operation. Each node 1710 in the LDO can be associated with one or more determinations 1740. A determination 1740 can contain a definition for a logical operation that can be automatically executed when a trigger condition is fulfilled. Example trigger conditions can include a modification of the associated node 1710, a modification of the data element 1720 of the associated node 1710, the creation of a data element 1720 of the associated node 1710, etc. A logical operation defined by an action 1730, or a determination 1740, can comprise instructions to create, update, read, or delete one or more data elements 1720 or one or more sub-nodes 1710.

Each node 1710 in the LDO can be associated with one or more validations 1750. A validation 1750 can contain a definition of one or more data integrity rules or checks. The one or more data integrity rules or checks can be performed when the associated node 1710, or one or more data elements 1720 of the associated node 1710, are created, modified, or deleted. Any such operation that does not satisfy the one or more data integrity rules or checks can be rejected. Some actions, determinations, or validations can be exposed to clients as LDO interface methods.

Each node 1710 in the LDO can be associated with one or more nodes from one or more other LDOs by one or more associations 1760. An association 1760 can contain an identifier for a node in another LDO that is associated with the node 1710. Associations 1760 can be used to define relationships among nodes in various LDOs. The association 1760, in at least some embodiments, contains an association type indicator that identifies a type of association between the node 1710 and the node in the other LDO. In some examples, a node 1710 can have an association with another node of the same LDO.

Although the action 1730 can be defined and associated with the node 1710, when the action 1730 is invoked, it can target an identified instance of the node 1710 with which it is associated. Similarly, a determination 1740 or validation 1750 can be defined and associated with a node 1710, but can target an instance of the associated node 1710 when it is invoked. Multiple instances of a given LDO schema can be created and accessed independently of one another. Although these LDO instances share a common schema, the data values stored in their respective node instances and data element instances can differ, as can the LDO instances that are associated by the associations 1760. Additionally or alternatively, an instance of an association 1760 can identify a particular instance of an associated node in another LDO instance. The identifier of a node instance can be an alphanumeric string that uniquely identifies the instance and, in at least some cases, can be used to look the instance up or retrieve data associated with the instance. Particular examples of identifiers include numerical values or universally unique identifiers. However, other types of identifiers can also be used.

Figure 18:
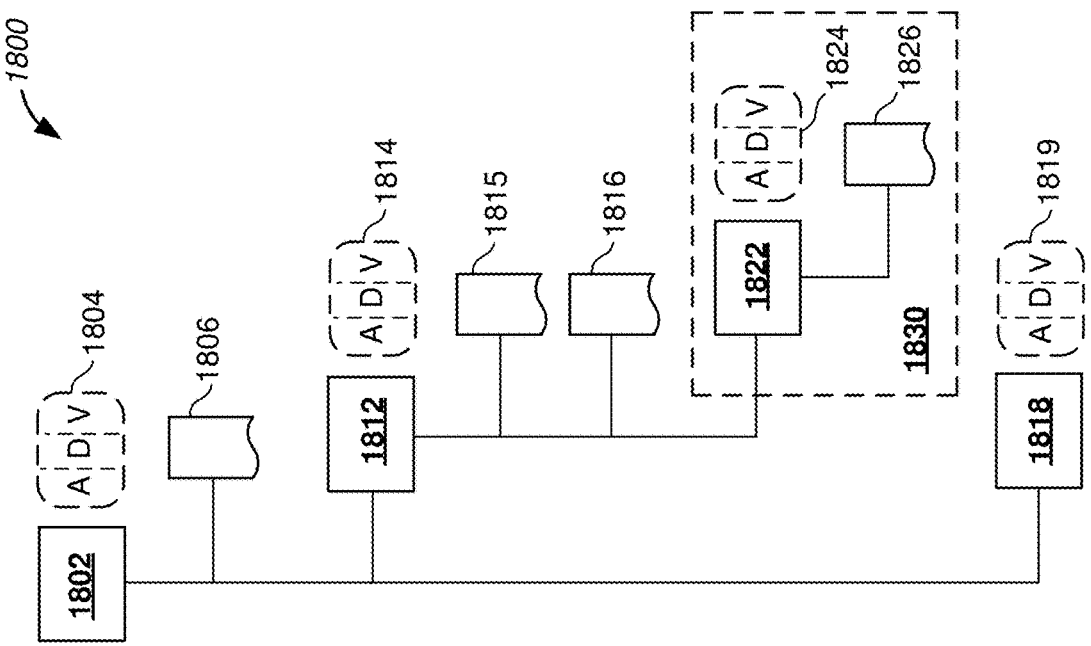
FIG. 18 is a diagram of an example LDO according to the disclosed technologies.

FIG. 18 is a diagram depicting an example logical data object 1800. The LDO 1800 comprises a root node 1802 which includes sub-nodes 1812 and 1818, and a data element 1806. Optionally, the root node 1802 can include one or more actions, associations, determinations, or validations 1804 (collectively "A|D|V"). The sub-node 1812 includes two data elements 1815, 1816, and a sub-node 1822. Optionally, the sub-node 1812 can include one or more actions, associations, determinations, or validations 1814. The sub-node 1818 optionally can include one or more actions, associations, determinations, or validations 1819. The sub-node 1822 includes a data element 1826, and optionally can include one or more actions, associations, determinations, or validations 1824.

A logical data object can be extended by one or more extension node definitions. For example, LDO 1800 is depicted in FIG. 18 as being extended by an extension node definition 1830 which defines the sub-node 1822 and data element 1826. An extension node definition can be used to add additional nodes, data elements, associations, actions, determinations, or validations to an extension node defined in the extension node definition. In any of the examples described herein, an LDO service or application server can be configured to receive an extension node definition for a logical data object and to process the extension node definition to add one or more extension sub-nodes or extension data elements to the logical data object. In some cases, access to the extension sub-nodes or extension data elements can be restricted to one or more users or groups of users.

Example Event Sequence

Figure 19:
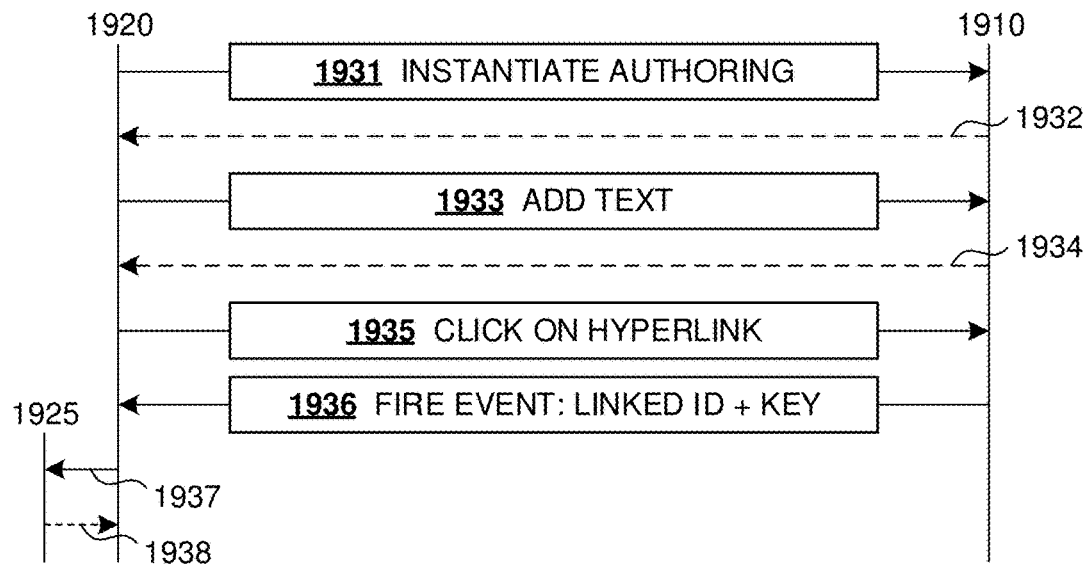
FIG. 19 is a diagram of example event interactions according to the disclosed technologies.

FIG. 19 is a diagram 1900 of example event interactions according to the disclosed technologies. Lane 1910 denotes a service providing a visual programming editor. Lane 1920 denotes a client application on an authoring station. Event 1931 requests commencement of an authoring session, and is transmitted from the client application 1920 to the listening service 1910. Responsive to event 1931, the service initiates an authoring session and then returns control to the client application 1920 as indicated by return arrow 1932. When an author user of the client application 1920 adds text in the document panel, event 1933 is transmitted to the service 1910, which takes appropriate action for the document panel and the document, and then returns control to the client 1920 at return arrow 1934. When an author user clicks on a hyperlink, event 1935 is sent to service 1910. In response, the service 1910 can provide an identifier to the link destination, or a key to a linked data item, as a responsive event 1936.

Lane 1926 denotes another thread or process, at the authoring station, that can perform application specific logic. Certain actions at the authoring UI can spawn 1937 activity of the logic process 1926. When complete, the client application 1920 can resume control, as indicated by return arrow 1938.

Example Text Processing

Figure 20:
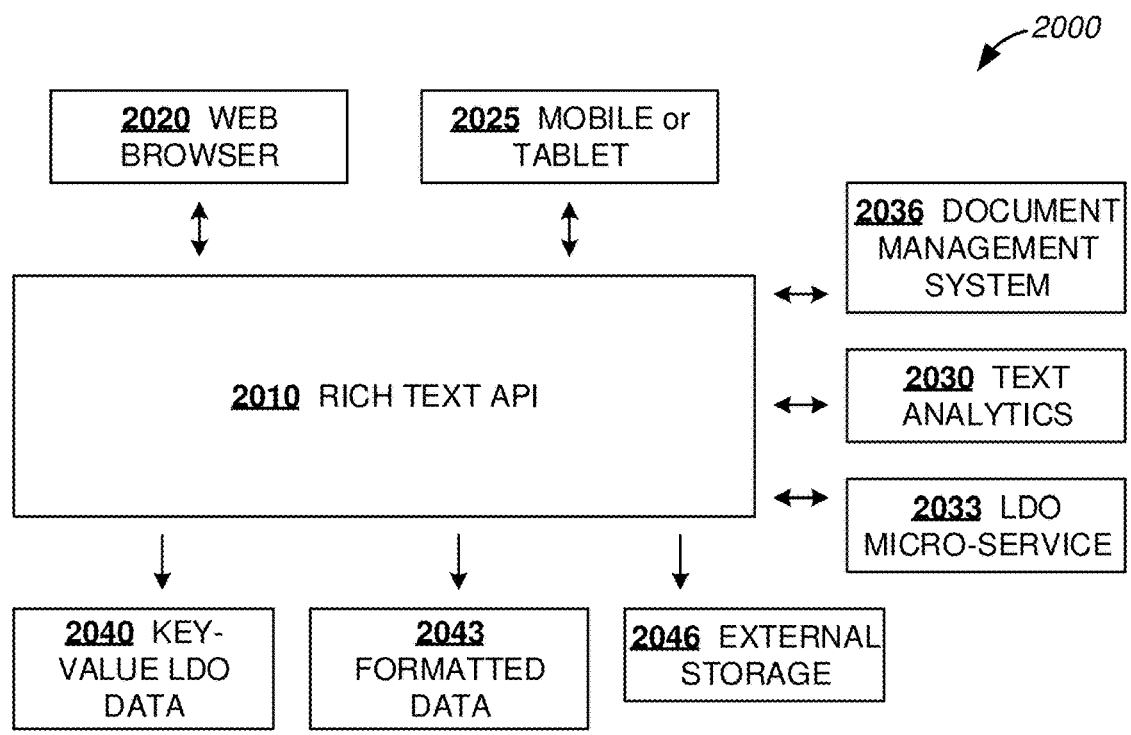
FIG. 20 is a diagram illustrating text processing for a third example deployment of the disclosed technologies.

FIG. 20 is a diagram 2000 illustrating text processing for a third example deployment of the disclosed technologies. A rich text application programming interface (API) 2010 can be configured to handle user inputs for an authored document, such as a workflow specification, in a workflow environment. For example, the authored document can be deployed in a web browser 2020 or on a mobile or tablet device 2025 similar to workstation 1410. The API 2010 can be implemented on a server (similar to server 1420) or as a cloud based service, coupled to the mobile device 2025 or web browser 2020 by a network connection such as a wireless link.

API 2010 can interface with additional software and services. Text analytics service 2030 can validate user input, checking formatting, spelling, or ranges of numerical quantities; or can perform other text processing functions. For example, text analytics service 2030 can implement sentiment analysis, and can infer mental or emotional state of a user, including responsiveness, alertness, or functional impairment. Sentiment analysis can be performed with the aid of a trained machine learning model. LDO microservice 2033 can support input/output functions with respect to data items available within an associated LDO. Document management system 2036 can provide and receive images or other documents to/from the deployed document.

Additionally, API 2010 can support output from the deployed document, which can be structured data, e.g., in the form of key-value pairs 2040 for LDO data items. Output from the deployed document can alternatively be provided as a formatted file 2043, e.g., using HTML, XML, JSON or other technology. Output can also be transmitted from API 2010 to external storage 2046.

In some examples, the disclosed technologies can be implemented as a method of managing a manufacturing workstation. An interactive workflow specification can be presented at the workstation for performance of workflow operations. The presenting can include retrieving current versions of first database items associated with output fields of the specification, and rendering the retrieved item versions at the workstation. Text can be received for input fields of the specification, and text analytics can be performed on first samples of the received text. Responsive to the text analytics, an error message, a hint, or auto-completion text can be displayed at the workstation. A trained machine learning model can be used to perform sentiment analysis on second samples of the received text. Responsive to the sentiment analysis, an abnormal condition can be identified and remedial action can be initiated. Third samples of the received text can be parsed as data values, which can be transmitted to an LDO by invocation of a method of the LDO for storage within the LDO. Fourth samples of the received text can be formatted according to a formatting specification and subsequently exported as a markup language document. Examples of the disclosed technologies can implement varying combinations of these features for samples of received text.

A Problem-Solving Perspective

The computing world moved quickly from machine-level programming (e.g., op-code "0101" means "add") to text-based programming languages (e.g., Algol, Fortran, C), and for decades "using a computer" was synonymous with "writing a computer program". Eventually the paradigm evolved and over the last 10-20 years so-called "apps" have taken root, allowing billions of people from all walks of life and wide-ranging technical proficiency to harness the computing power of their mobile phones with a handful of apps and no programming required. However, the app itself still needs to be written. And, even in the cutting edge field of mobile apps, the five most popular languages—Python, Java, PHP, JavaScript, and C++—are all text-based programming languages.

Turning to the present disclosure, the technologies herein are particularly concerned with software that links a database with a workflow. Text-based software code linking a workflow with a database suffers from three distinct problems. Firstly, the software code needs to be written when the workflow is initially developed, which can be a time-consuming and error-prone process requiring significant debugging resources. Secondly, revisions to the workflow require revisions to the software code, which is similarly error-prone and engenders further debugging. Finally, changes to the database structure (e.g., change in vendor, change in scale of the database, or incorporation of new and improved database technology) can require software code to be revised. The problems inherent in these code revisions are magnified because the software developer may not be a domain expert for the workflow, or the domain expert may have weak coding skills.

These issues are manifest over the lifecycle of the software application and are caused, in part, by the fragility of the building blocks—the text-based code and the fixed database. Fragility of software is a technical problem no less than, say, fragility of glass.

The disclosed technologies combine visual programming and logical data objects (LDOs) to solve all three problems, in the specific niche software area of integrating a workflow with a database. Visual programming eliminates the text language programming when a workflow is created or revised. However, visual programming by itself does not solve the problem when a conventional database structure is modified, because underlying the visual program are text-based calls (e.g., SQL) that rely on knowing the structure of a database to access data. Thus, conventional data access calls face a moving target when the database structure is changed. By encapsulating a database with its access methods, an LDO can provide a fixed interface (i.e., a stationary target) even when an underlying database is changed. Similarly, an LDO by itself does not solve the coding problem, because the LDO's interface methods may still be text-based calls. However, when utilized together, visual programming and LDOs permit software applications to integrate a workflow and a database without any of the conventional problems associated with writing, revising, or debugging text-based software code. The resulting software applications are robust, self-documenting, and easy to maintain over the lifecycles of the workflow and the database.

A Generalized Computer Environment

Figure 21:
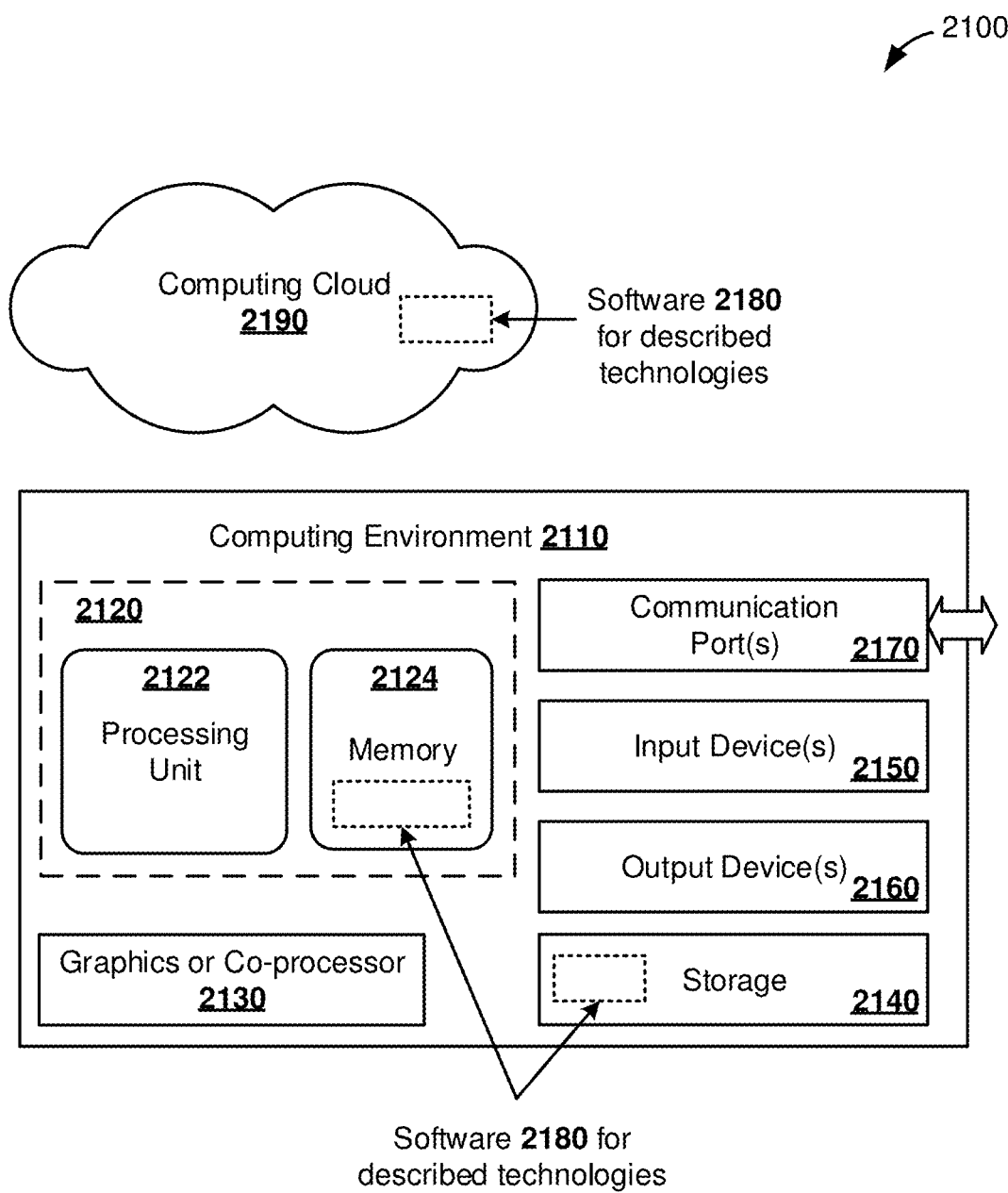
FIG. 21 is a diagram schematically depicting a computing environment suitable for implementation of disclosed technologies.

FIG. 21 illustrates a generalized example of a suitable computing system 2100 in which described examples, techniques, and technologies, including construction, deployment, operation, and maintenance of tools and stations for integration of an LDO with workflow according to disclosed technologies can be implemented. The computing system 2100 is not intended to suggest any limitation as to scope of use or functionality of the present disclosure, as the innovations can be implemented in diverse general-purpose or special-purpose computing systems.

With reference to FIG. 21, computing environment 2110 includes one or more processing units 2122 and memory 2124. In FIG. 21, this basic configuration 2120 is included within a dashed line. Processing unit 2122 executes computer-executable instructions, such as for implementing any of the methods or objects described herein for visually programming an interactive workflow specification, for launching a workflow, for communication between a station and an LDO, or various other architectures, components, handlers, managers, modules, and repositories described herein. Processing unit 2122 can be a general-purpose central processing unit (CPU), a processor in an application-specific integrated circuit (ASIC), or any other type of processor. In a multi-processing system, multiple processing units execute computer-executable instructions to increase processing power. Computing environment 2110 can also include a graphics processing unit or co-processing unit 2130. Tangible memory 2124 can be volatile memory (e.g., registers, cache, or RAM), non-volatile memory (e.g., ROM, EEPROM, or flash memory), or some combination thereof, accessible by processing units 2122, 2130. The memory 2124 stores software 2180 implementing one or more innovations described herein, in the form of computer-executable instructions suitable for execution by the processing unit(s) 2122, 2130. The memory 2124 can also store configuration data, UI displays, browser code, data structures including data tables, working tables, change logs, output structures, input fields, output fields, data values, indices, or flags, as well as other configuration and operational data.

A computing system 2110 can have additional features, such as one or more of storage 2140, input devices 2150, output devices 2160, or communication ports 2170. An interconnection mechanism (not shown) such as a bus, controller, or network interconnects the components of the computing environment 2110. Typically, operating system software (not shown) provides an operating environment for other software executing in the computing environment 2110, and coordinates activities of the components of the computing environment 2110.

The tangible storage 2140 can be removable or non-removable, and includes magnetic disks, magnetic tapes or cassettes, CD-ROMs, DVDs, or any other medium which can be used to store information in a non-transitory way and which can be accessed within the computing environment 2110. The storage 2140 stores instructions of the software 2180 (including instructions and/or data) implementing one or more innovations described herein.

The input device(s) 2150 can be a mechanical, touch-sensing, or proximity-sensing input device such as a keyboard, mouse, pen, touchscreen, trackball, a voice input device, a scanning device, or another device that provides input to the computing environment 2110. The output device(s) 2160 can be a display, printer, speaker, optical disk writer, or another device that provides output from the computing environment 2110.

The communication port(s) 2170 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 2100 can also include a computing cloud 2190 in which instructions implementing all or a portion of the disclosed technology are executed. Any combination of memory 2124, storage 2140, and computing cloud 2190 can be used to store software instructions and data of the disclosed technologies.

The present innovations can be described in the general context of computer-executable instructions, such as those included in program modules, being executed in a computing system on a target real or virtual processor. Generally, program modules or components include routines, programs, libraries, software objects, classes, components, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in a hardware processor or another form of physical computer hardware.

Example Cloud Computing Environment

Figure 22:
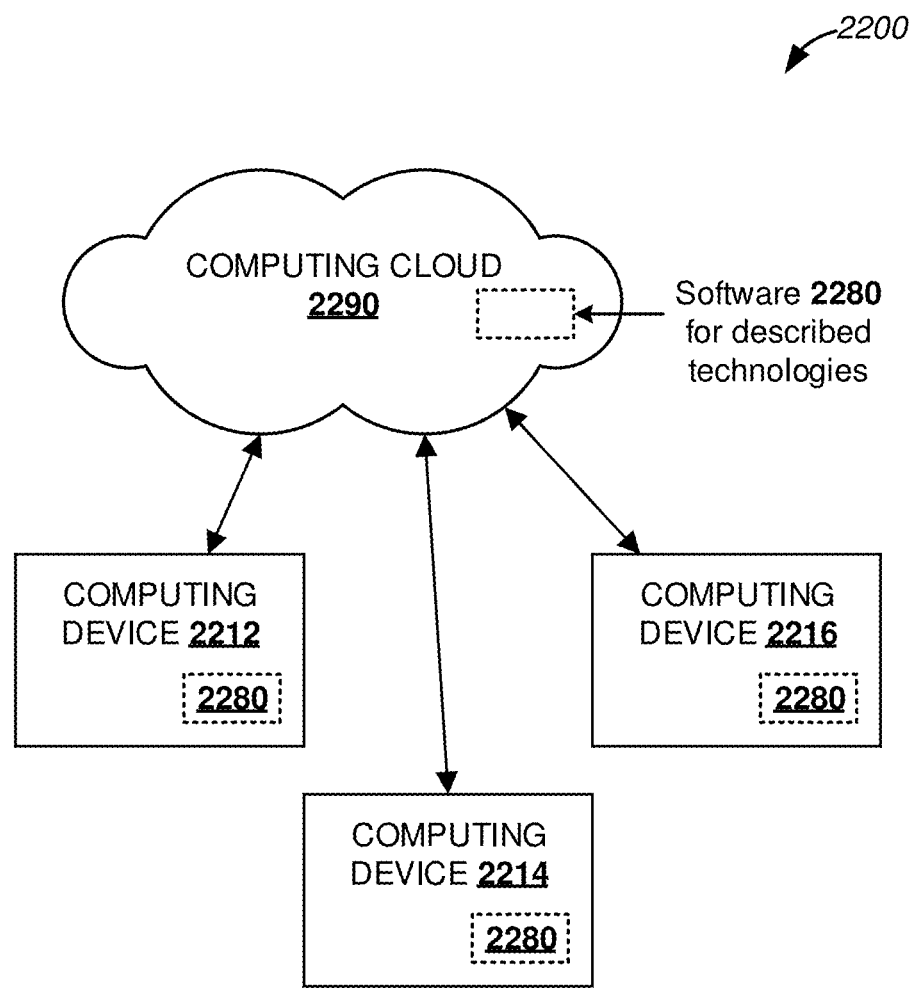
FIG. 22 is a diagram schematically depicting computing devices operating in conjunction with a computing cloud for implementation of disclosed technologies.

FIG. 22 depicts an example cloud computing environment 2200 in which the described technologies can be implemented. The cloud computing environment 2200 comprises a computing cloud 2290 containing resources and providing services. The computing cloud 2290 can comprise various types of cloud computing resources, such as computer servers, data storage repositories, networking resources, and so forth. The computing cloud 2290 can be centrally located (e.g., provided by a data center of a business or organization) or distributed (e.g., provided by various computing resources located at different locations, such as different data centers and/or located in different cities or countries).

The computing cloud 2290 can be operatively connected to various types of computing devices (e.g., client computing devices), such as computing devices 2212, 2214, and 2216, and can provide a range of computing services thereto. One or more of computing devices 2212, 2214, and 2216 can be computers (e.g., server, virtual machine, embedded systems, desktop, or laptop computers), mobile devices (e.g., tablet computers, smartphones, or wearable appliances), or other types of computing devices. Connections between computing cloud 2290 and computing devices 2212, 2214, and 2216 can be over wired, wireless, or optical links, or any combination thereof, and can be short-lived or long-lasting. These connections can be stationary or can move over time, being implemented over varying paths and having varying attachment points at each end. Computing devices 2212, 2214, and 2216 can also be connected to each other.

Computing devices 2212, 2214, and 2216 can utilize the computing cloud 2290 to obtain computing services and perform computing operations (e.g., data processing, data storage, and the like). Particularly, software 2280 for performing the described innovative technologies can be resident or executed in the computing cloud 2290, in computing devices 2212, 2214, and 2216, or in a distributed combination of cloud and computing devices.

General Considerations

As used in this disclosure, the singular forms "a," "an," and "the" include the plural forms unless the context clearly dictates otherwise. Additionally, the terms "includes" and "incorporates" mean "comprises." Further, the terms "coupled" or "attached" encompass mechanical, electrical, magnetic, optical, as well as other practical ways of coupling or linking items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "access," "add," "apply," "build," "cache," "call," "collect," "compare," "compile," "configure," "convey," "create," "couple," "define," "deploy," "determine," "embed," "execute," "expand," "export," "expose," "extend," "flag," "form," "format," "generate," "host," "identify," "indicate," "insert," "interpret," "invoke," "link," "list," "load," "mark," "merge," "modify," "obtain," "overwrite," "parse," "perform," "present," "process," "provide," "receive," "register," "remove," "render," "respond," "retrieve," "select," "set," "store," "tag," "test," "train," "transmit," "trigger," "update," "use," "validate," "verify," "wrap," to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 21, computer-readable storage media include memory 2124, and storage 2140. The term computer-readable storage media does not include signals and carrier waves. In addition, the term computer-readable storage media does not include communication ports (e.g., 2170) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in ABAP, Adobe Flash, C, C++, C #, Curl, Dart, Fortran, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

I claim:

1. One or more non-transitory computer-readable media storing instructions which, when executed by one or more processors, cause the one or more processors to perform operations to define an interactive workflow associated with logical data objects (LDOs) having data items stored in one or more production databases, the operations comprising:
presenting, through a graphical authoring user interface for visual programming, a specification of the interactive workflow;
wherein the graphical authoring user interface comprises a document panel, an LDO panel, and a control panel, and the specification of the interactive workflow is presented in the document panel;
receiving, through the graphical authoring user interface for visual programming, user input that defines the specification of the interactive workflow, the specification comprising input fields associated with at least some of the data items and output fields associated with at least some of the data items, the data items being accessible through interfaces of the LDOs;
wherein the received user input comprises a selection of an indicator of a data item in the LDO panel for a given one of the input fields, and the operations further comprise:
responsive to the selection, adding a tagged record for the given input field in the specification;
linking the output fields of the specification with the one or more production databases via respective retrieval calls to the interfaces of the LDOs, wherein the linking the output fields enables, during presentation of the specification at run time at a client device for performance of workflow operations of the interactive workflow, retrieval, using the retrieval calls, of current values of the data items associated with the output fields from the one or more production databases;
wherein the linking the output fields includes generating markup-language statements invoking the retrieval calls to the interfaces of the LDOs;
linking the input fields of the specification with the one or more production databases via respective storage calls to the interfaces of the LDOs, wherein the linking the input fields enables, responsive to the workflow operations, transmission, using the storage calls, of new values of the data items associated with the input fields for storage in the one or more production databases;
wherein the linking the input fields includes generating markup-language statements invoking the storage calls to the interfaces of the LDOs; and
storing the specification.

2. The non-transitory computer-readable media of claim 1, wherein the presenting the specification of the interactive workflow comprises retrieving and displaying the current values of the data items associated with the output fields.

3. The non-transitory computer-readable media of claim 1, wherein the one or more production databases comprise a relational database, and at least one of the input fields or the output fields is linked to a data element, a row, a table, or a view of the relational database.

4. The non-transitory computer-readable media of claim 1, wherein the one or more production databases comprise a document management system, and at least one of the input fields or the output fields is linked to a document stored in the document management system.

5. The non-transitory computer-readable media of claim 1, wherein the one or more production databases comprise a table shared between the LDOs.

6. The non-transitory computer-readable media of claim 1, wherein the client device is a manufacturing workstation and the new values are measurements; and wherein the manufacturing workstation is a producer of the data items associated with the input fields and is a consumer of the data items associated with the output fields.

7. The non-transitory computer-readable media of claim 1, wherein the retrieval calls and the storage calls are exposed by the LDOs while hiding underlying data structures.

8. The non-transitory computer-readable media of claim 1, wherein the adding is based on a key retrieved for the selected data item.

9. The non-transitory computer-readable media of claim 1, wherein the generated markup-language statements invoking the storage calls to the interfaces of the LDOs comprise a first markup-language statement corresponding to the given input field; and
the generating the first markup-language statement comprises transforming the tagged record into the first markup-language statement;
wherein invocation of the first markup language statement stores a data value associated with the selected data item.

10. One or more non-transitory computer-readable media storing instructions which, when executed by one or more processors, cause the one or more processors to perform operations to define an interactive workflow associated with logical data objects (LDOs) having data items stored in one or more production databases, the operations comprising:
presenting, through a graphical user interface for visual programming, a specification of the interactive workflow, wherein the presenting comprises:
providing an authoring user interface comprising a document panel, an LDO panel, and a control panel; and
rendering the specification of the interactive workflow in the document panel;
receiving, through the graphical user interface for visual programming, user input that defines the specification of the interactive workflow, the specification comprising input fields associated with at least some of the data items and output fields associated with at least some of the data items, the data items being accessible through interfaces of the LDOs;
linking the input fields of the specification with the one or more production databases via respective storage calls to the interfaces of the LDOs, wherein the linking the input fields enables, responsive to the workflow operations, transmission, using the storage calls, of new values of the data items associated with the input fields for storage in the one or more production databases;
wherein the received user input comprises a selection of an indicator of a data item in the LDO panel for a given one of the input fields, and the operations further comprise:
responsive to the selection:
obtaining a key of the selected data item;
rendering one or more input controls in the document panel; and
based on the key, adding a tagged record for the given input field in the specification; and
transforming the tagged record into one or more markup language statements invoking a call to an LDO interface to store a data value associated with the selected data item;

linking the output fields of the specification with the one or more production databases via respective retrieval calls to the interfaces of the LDOs, wherein the linking the output fields enables, during presentation of the specification at run time at a client device for performance of workflow operations of the interactive workflow, retrieval, using the retrieval calls, of current values of the data items associated with the output fields from the one or more production databases; and storing the specification, the storing comprising exporting the specification as a markup language file comprising the one or more markup language statements.

11. The non-transitory computer-readable media of claim 10, wherein the operations further comprise:

providing a configuration screen; and responsive to receiving, on the configuration screen, a selection of a data item for a given one of the output fields, the given output field being associated with an LDO, rendering an indicator of the selected data item for the given output field within the LDO panel.

12. The non-transitory computer-readable media of claim 10, wherein the operations further comprise:

responsive to receiving a selection, on the LDO panel, of an indicator of a data item for a given one of the output fields, the given output field being associated with an LDO:

obtaining a key of the selected data item for the given output field;

adding a tagged record for the given output field in the specification, the tagged record for the given output field comprising the key of the selected data item for the given output field;

retrieving, with the key of the selected data item for the given output field, a current value of the selected data item for the given output field; and rendering the retrieved value in the document panel.

13. The non-transitory computer-readable media of claim 12, wherein the data item for the given output field comprises an element of a row of a relational database table accessible through the LDO.

14. The non-transitory computer-readable media of claim 10, wherein the data item indicated in the LDO panel is an inspection record, and the operations further comprise, based on the key:

retrieving a display item of the inspection record; and rendering the display item in the document panel.

15. The non-transitory computer-readable media of claim 10, wherein the indicator of the data item is a first indicator of a first data item, and the LDO panel comprises a plurality of indicators, including the first indicator, of respective data items, together with respective indicia indicating whether the corresponding data items are referenced in the specification.

16. An authoring station comprising:

one or more processors with memory coupled thereto;

a network interface through which the one or more processors are coupled to a network to access one or more LDOs represented in the LDO panel; and the non-transitory computer-readable media of claim 10.

17. A system comprising:

the authoring station of claim 16;

a computing environment comprising:

a computer server;

an operating system;

a computer process serving calls to a given LDO of the one or more LDOs; and a computer process running a database application associated with the given LDO; and a workstation configured to receive at least a part of the specification and support the interactive workflow specified by the specification.

18. A computer-implemented method comprising:

presenting, through a graphical authoring user interface for visual programming, a specification of an interactive workflow associated with logical data objects (LDOs) having data items stored in one or more production databases;

wherein the graphical authoring user interface comprises a document panel, an LDO panel, and a control panel, and the specification of the interactive workflow is presented in the document panel;

receiving, through the graphical authoring user interface for visual programming, user input that defines the specification of the interactive workflow, the specification comprising input fields associated with at least some of the data items and output fields associated with at least some of the data items, the data items being accessible through interfaces of the LDOs;

wherein the received user input comprises a selection of an indicator of a data item in the LDO panel for a given one of the input fields, and the operations further comprise:

responsive to the selection, adding a tagged record for the given input field in the specification;

linking the output fields of the specification with the one or more production databases via respective retrieval calls to the interfaces of the LDOs, wherein the linking the output fields enables, during presentation of the specification at run time at a client device for performance of workflow operations of the interactive workflow, retrieval, using the retrieval calls, of current values of the data items associated with the output fields from the one or more production databases;

wherein the linking the output fields includes generating markup-language statements invoking the retrieval calls to the interfaces of the LDOs;

linking the input fields of the specification with the one or more production databases via respective storage calls to the interfaces of the LDOs, wherein the linking the input fields enables, responsive to the workflow operations, transmission, using the storage calls, of new values of the data items associated with the input fields for storage in the one or more production databases;

wherein the linking the input fields includes generating markup-language statements invoking the storage calls to the interfaces of the LDOs; and storing the specification.

19. The computer-implemented method of claim 18, wherein the presenting the specification of the interactive workflow comprises retrieving and displaying the current values of the data items associated with the output fields.

* * * * *